United States Patent
Ritchie et al.

(10) Patent No.: US 6,340,152 B1
(45) Date of Patent: *Jan. 22, 2002

(54) SEAT SUSPENSION VIBRATION DAMPER

(75) Inventors: Norman E. Ritchie; Christopher J. Sameck, both of Portland; Marc Milobinski, Scappoosse, all of OR (US)

(73) Assignee: Freightliner LLC, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/245,053

(22) Filed: Feb. 4, 1999

(51) Int. Cl.$^7$ .................................................. F16F 5/00
(52) U.S. Cl. ............................. 267/64.12; 297/344.16; 188/300; 267/131
(58) Field of Search ....................... 297/344.15, 344.16; 267/64.12; 188/300

(56) References Cited

U.S. PATENT DOCUMENTS

| | | | |
|---|---|---|---|
| 1,736,503 A | 11/1929 | Marshall | |
| 2,019,159 A | 10/1935 | Saunders | |
| 2,151,419 A | 3/1939 | Buchner | |
| 2,433,950 A | 1/1948 | Henderson | |
| 2,609,034 A | 9/1952 | Barecki | |
| 2,771,124 A | 11/1956 | Borsani | |
| 2,805,702 A | 9/1957 | Appleton | |
| 3,100,101 A | 8/1963 | Trevaskis | |
| 3,105,670 A | 10/1963 | Pickles | |
| 3,250,566 A | 5/1966 | Rainey | |
| 3,298,654 A | 1/1967 | Dome | |
| 3,362,746 A | 1/1968 | Huyge | |
| 3,363,941 A | 1/1968 | Wierwille | |
| 3,608,855 A | 9/1971 | Osenberg | |
| 3,628,763 A | 12/1971 | Auer | |
| 3,700,203 A | 10/1972 | Adams | |
| 3,787,025 A | 1/1974 | Sturhan | |
| 3,814,370 A | 6/1974 | Hurwitz | |
| 3,917,209 A | 11/1975 | Adams | |
| 3,954,245 A | * 5/1976 | Costin | 297/344.15 |
| 3,994,469 A | 11/1976 | Swenson et al. | |
| 4,289,351 A | * 9/1981 | Wahls | 248/429 |
| 4,589,620 A | 5/1986 | Sakamoto | |
| 4,629,254 A | 12/1986 | Stolper et al. | |
| 4,634,179 A | 1/1987 | Hashimoto et al. | |
| 4,678,155 A | 7/1987 | Carter | |
| 4,730,804 A | 3/1988 | Higuchi et al. | |
| 4,809,944 A | * 3/1989 | Smith et al. | 248/631 |
| 4,817,908 A | * 4/1989 | Hanlon et al. | 248/564 |

(List continued on next page.)

Primary Examiner—Robert J. Oberleitner
Assistant Examiner—Devon Kramer
(74) Attorney, Agent, or Firm—Klarquist Sparkman LLP

(57) ABSTRACT

A vibration damper module is described with a first member adapted for coupling to one of the vehicle and seat, and a shock absorber adapted to be coupled to the other of the vehicle and seat. The first member may take the form of a housing within which the shock absorber is substantially disposed. A latch selectively couples and decouples the housing to the shock absorber to respectively apply and relieve the application of the dampening force from the shock absorber to the seat which dampens vibrations in the seat. The shock absorber may include an external housing carrying a latch gripping surface, such as a plurality of teeth. The latch may comprise at least one latch arm having a latch surface. The latch arm may be shifted to a first position in which the latch surface and latch gripping surface are engaged to couple the first member to the shock absorber and to a second position wherein these components are disengaged. The latch arm may be pivoted to the housing with the housing also pivoted to one of the vehicle and seat. The shock absorber may also be slidably coupled to the housing. In addition, the shock absorber may apply a nonlinear dampening force to the seat when the latch arm is in the first position.

25 Claims, 21 Drawing Sheets

U.S. PATENT DOCUMENTS

| | | |
|---|---|---|
| 4,881,774 A | 11/1989 | Bradley et al. |
| 4,898,356 A | 2/1990 | Pipon et al. |
| 4,941,641 A | 7/1990 | Granzow et al. |
| 4,946,145 A | 8/1990 | Kurabe |
| 5,004,206 A | 4/1991 | Anderson |
| 5,058,852 A | 10/1991 | Meier et al. |
| 5,207,479 A * | 5/1993 | Wickman et al. ........... 297/302 |
| 5,222,709 A | 6/1993 | Culley, Jr. et al. |
| 5,366,196 A | 11/1994 | Mitschelen et al. |
| 5,407,165 A | 4/1995 | Balocke |
| 5,472,165 A | 12/1995 | Gruber |
| 5,570,866 A * | 11/1996 | Stephens .................... 248/631 |
| 5,571,273 A | 11/1996 | Saarinen |
| 5,597,206 A | 1/1997 | Ainsworth et al. |
| 5,651,585 A * | 7/1997 | Van Duser ............. 297/344.16 |
| 5,707,110 A | 1/1998 | Campbell et al. |
| 5,873,629 A | 2/1999 | Schuler |
| 5,950,977 A | 9/1999 | Proksch et al. |
| 5,957,426 A | 9/1999 | Broderson |
| 5,975,508 A | 11/1999 | Beard |

\* cited by examiner

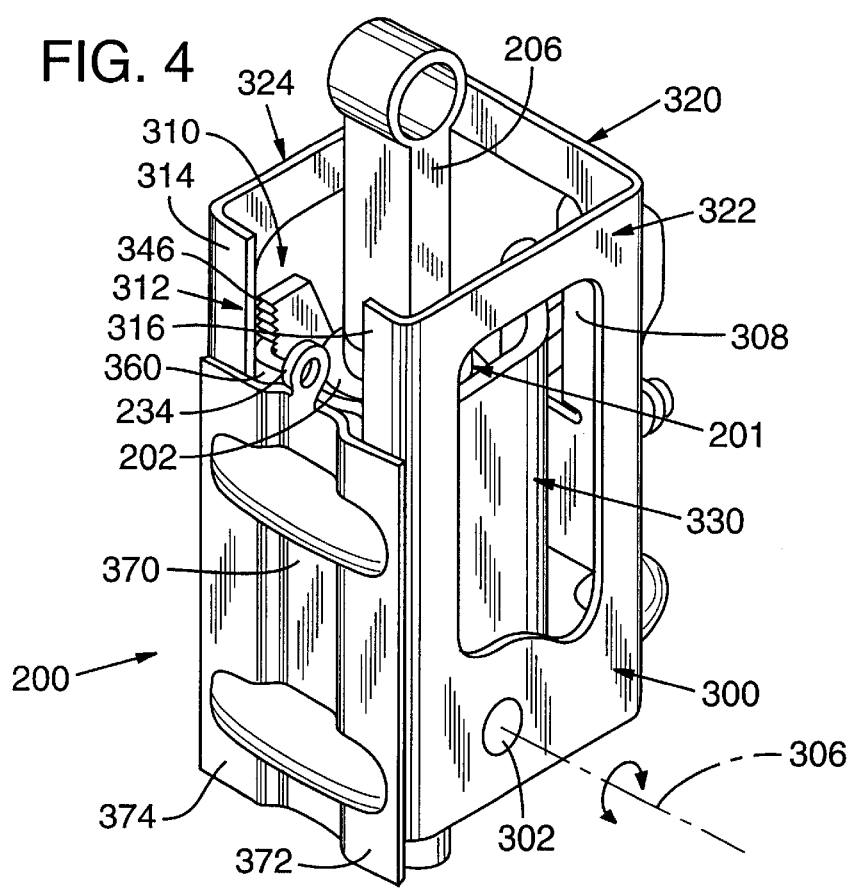

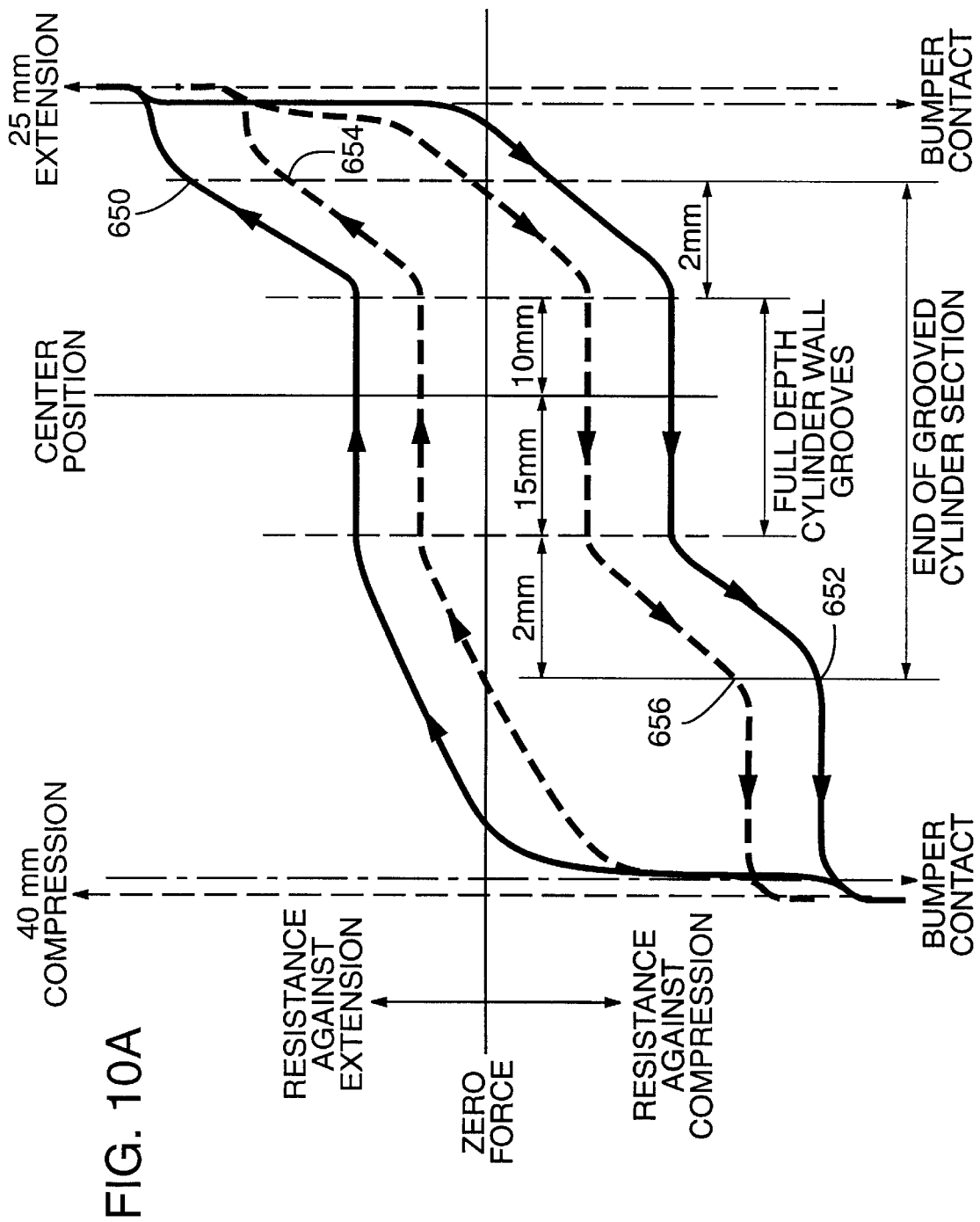

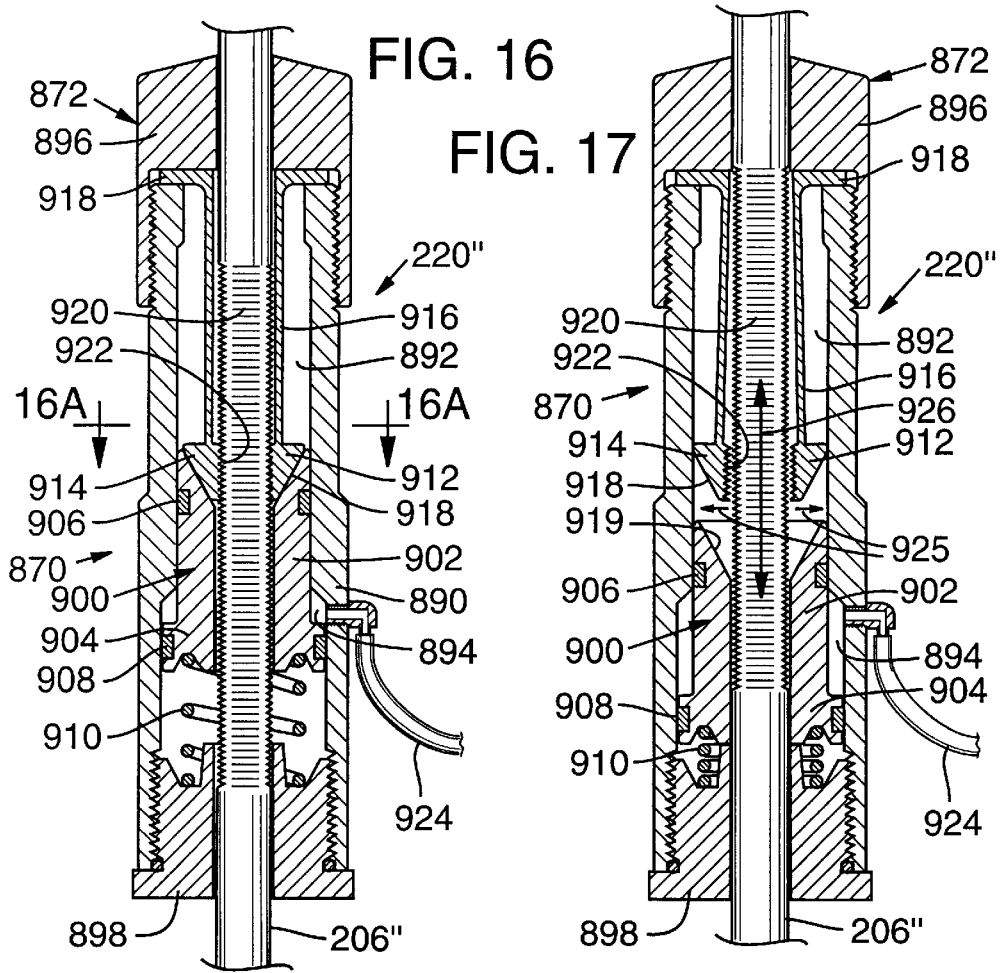
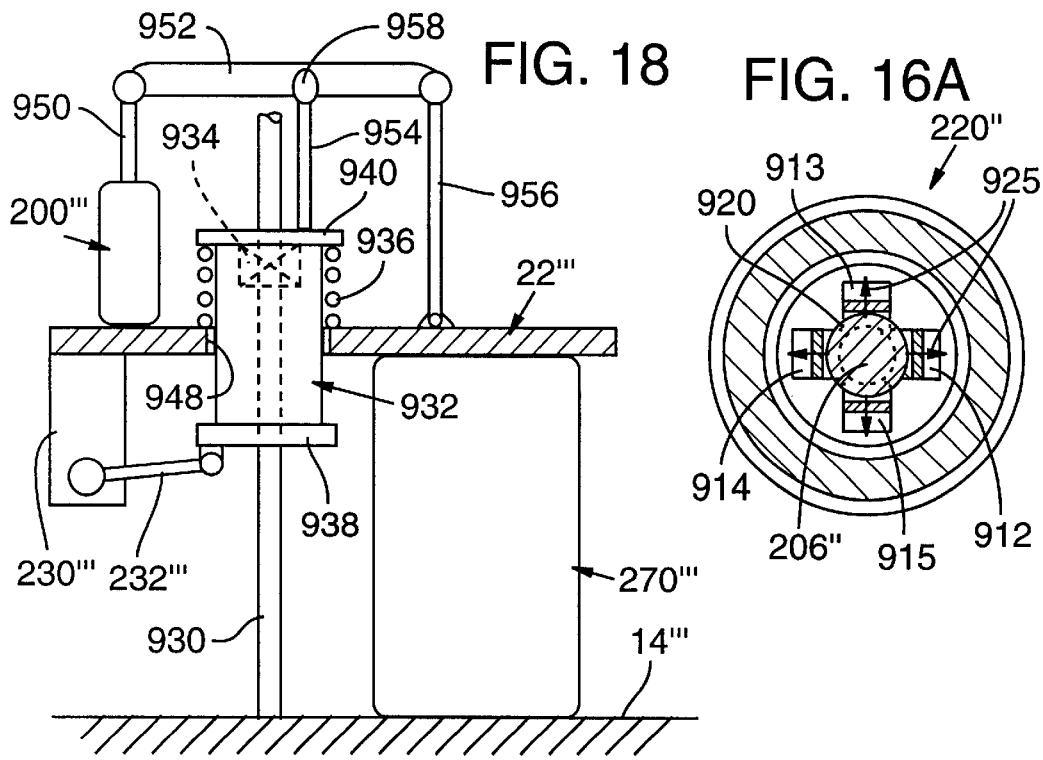

CENTERED

LOWER

RAISE

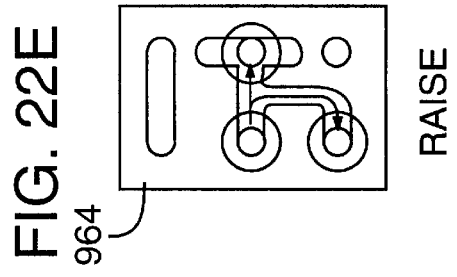
FIG. 22E RAISE
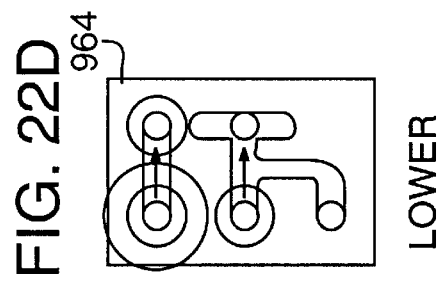
FIG. 22D LOWER
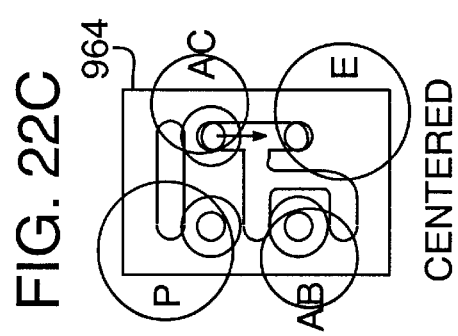
FIG. 22C CENTERED
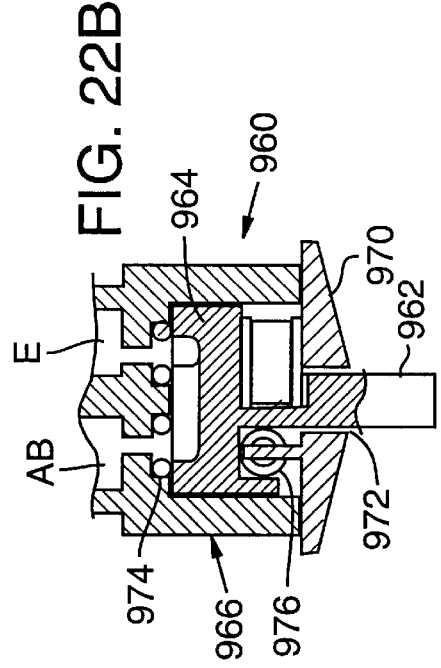
FIG. 22B
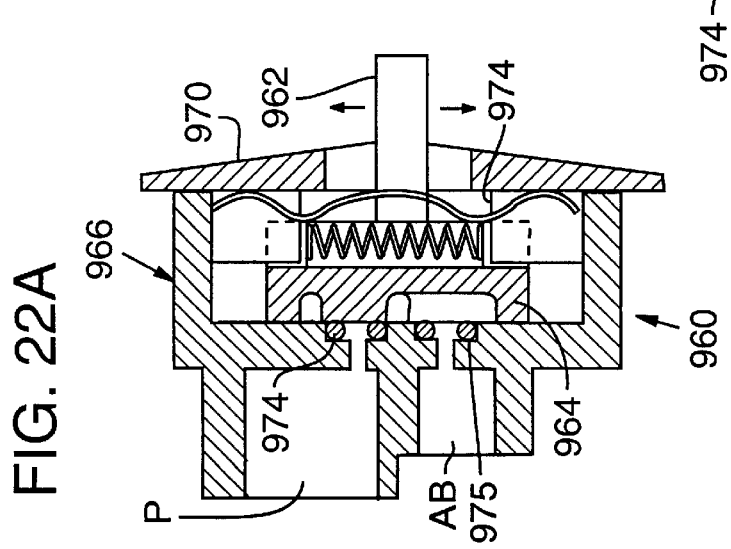
FIG. 22A

SEAT SUSPENSION VIBRATION DAMPER

BACKGROUND OF THE INVENTION

The present invention relates to a seat suspension vibration damper for dampening vibrations of a vehicle seat.

Numerous vehicle seat suspensions are known, including those having air bag or air spring suspensions for resiliently supporting a seat in a selected position. In such suspension systems, pressurized air is delivered to or exhausted from the air bag to adjust the elevation of the seat. The use of an air bag permits upward and downward vibrations of the seat. To counteract these vibrations, shock-absorbing cylinders have been used to dampen the seat vibrations.

In one known approach, as the elevation of the seat suspension is changed by inflating or deflating the air bag, the shock absorbing cylinder has a piston supporting rod which extends or retracts, depending upon the direction in which the seat elevation is changed. In this approach, the shock absorbing cylinder must be capable of extension and retraction throughout the entire range of seat elevation adjustment. In addition, these seat suspension systems are understood to use shock absorbing cylinders with pistons that apply a constant dampening force over the full stroke of the piston. If the dampening force were non-constant in such systems, problems would ensue. For example, in such systems a non-constant dampening force would mean that the ride provided by the seat would vary depending upon the seat elevation.

U.S. Pat. No. 3,951,373 illustrates one form of seat suspension utilizing a shock absorbing cylinder and an air bag or air spring. In this construction, the shock absorber is understood to have a stroke which is capable of extending and retracting throughout the full range of seat height adjustment. However, in this construction, a hand knob may be operated to adjust the throw of a shaft to thereby change the effective length of the shock absorber.

Although numerous seat suspension systems are known and a number of them have mechanisms for dampening seat vibrations, a need nevertheless exists for an improved vibration damper for a seat suspension system having new and non-obvious differences from vibration dampers used in known systems.

SUMMARY

A vibration damper is described for use in seat suspension systems such as those of the type which support a seat above the floor of a vehicle, the seat being raisable and lowerable to support the seat at various selected elevations relative to the floor of the vehicle, and wherein movement of the seat from a selected elevation in response to vibrations is permitted. The vibration damper is operable to dampen these seat vibrations when the vibration damper is operatively coupled to the seat suspension system. In one illustrated form, the vibration damper comprises a self-contained module which is convenient to install in a seat suspension system. Also, removal thereof, for example in the case of repair or replacement, is relatively convenient.

In one illustrated embodiment, the vibration damper includes a first member adapted for coupling to one of the vehicle and seat. The first member may comprise a housing or may take other configurations. The phrases "for coupling to" or "coupled to" one of the vehicle and seat includes direct and indirect connection to one of these components. For example, the first member may be connected to a base or other component of a seat support which is affixed to the vehicle. Alternatively, the first member may be directly or indirectly connected to the seat, for example to a platform or seat support upon which a seat is mounted or directly to the seat. In addition, the vibration damper of this embodiment includes a shock absorber adapted to be coupled to the other of the vehicle and seat, again, direct or indirect coupling is contemplated. Moreover, a latch is adapted to selectively couple the first member to the shock absorber such that when the shock absorber and first member are coupled together the shock absorber applies a dampening force to the seat. In addition, when the shock absorber and first member are decoupled from one another the shock absorber is relieved from applying a dampening force to the seat.

In accordance with a further aspect of an embodiment, the first member may comprise a housing with an interior and an exterior with the shock absorber being substantially positioned or disposed within the interior of the housing and thereby protected by the housing. In addition, the latch may also be carried by the housing and operated by a latch actuator to selectively couple and decouple the shock absorber to and from the housing to thereby selectively apply and relieve the application of the dampening force to the seat. The latch actuator may be a fluid actuator, such as a pneumatic actuator, an electrically operated actuator, such as a motor, for shifting the latch to couple and decouple the shock absorber in response to the actuator. Although less preferred, a mechanical actuator may be used of the type which is manually shifted to couple and decouple the shock absorber to and from the housing.

As another aspect of an embodiment, the shock absorber may include a cylinder or exterior housing with a latch gripping surface carried by the cylinder. The latch gripping surface may be a friction enhanced surface or may comprise a mechanism mounted to the cylinder such as a plurality of teeth. The shock absorber also may include a dampening piston within the cylinder and a piston rod coupled to the piston and having an end portion projecting outwardly from the piston for coupling to the other of the vehicle and seat (the other of the vehicle and seat in this case being the other of these components to which the first member or housing is not coupled).

The latch may include at least one latch arm with a latch surface which may be a friction enhanced surface. Like the latch gripping surface, the latch surface may comprise a plurality of teeth. The latch arm may be coupled to the first member or housing with the latch arm being movable between first and second positions. When the latch arm is in the first position, the latch surface of the latch arm engages the latch gripping surface carried by the cylinder to thereby couple the shock absorber to the first member or housing. When the latch arm is in the second position, the latch surface is disengaged from the latch gripping surface. The latch arm may be pivoted to the first member or housing, in the case wherein the first member takes the form of a housing, for pivoting movement between the first and second positions. In one specific approach, both the first member, such as the housing, and latch arm are pivotally coupled to said one of the vehicle and seat for pivoting about a common first pivot axis.

As another aspect of an illustrated embodiment, the shock absorber cylinder may be slidably coupled to the first member, or housing in the case the first member takes the form of a housing, for sliding movement relative to the first member. Thus, the first member may comprise a housing having a first side wall with an exterior surface at the exterior of the housing and an interior surface at the interior of the housing. The first side wall may include first and second side wall portions spaced apart from one another to define a guide slot therebetween. The slide element may be mounted to the cylinder and slidably coupled to the first and second side wall portions such that the slide element slides along the guide slot and guides the sliding motion of the cylinder and thereby the shock absorber relative to the housing. This sliding inter-connection of these elements may be independent of the operation of the latch.

In a more specific approach, the cylinder may be substantially disposed within the housing. In addition, the slide elements may include first and second inter-connected slide members which sandwich the respective first and second side wall portions therebetween. In this case, the first slide member may be positioned substantially within the housing and may include respective first and second teeth containing flange portions extending in a direction away from the first side wall of the housing, the first and second teeth containing flange portions being spaced apart from one another and positioned at opposite sides of the center of the cylinder from one another. Furthermore, the latch arm may have a generally U-shaped cross-section with a base and first and second leg portions. The first and second leg portions may each terminate in an elongated row of teeth and are aligned with a respective adjacent one of the first and second teeth supported flange portions of the first slide member. The teeth of the first and second leg portions engage the teeth of the respective adjacent flange portions when the latch arm is in the first position.

As a further aspect of an embodiment, the housing may include a second wall opposite to the first wall, the second wall including an arm flange receiving opening therein. The latch arm includes an arm flange projecting outwardly from the base toward the arm flange receiving opening. An actuator guide flange also projects outwardly from the second wall of the housing with the guide flange defining the actuator guide slot. A fluid actuator is provided for operating the latch, the actuator having an actuator cylinder which is pivoted to the housing, an actuator piston within the actuator cylinder, and an actuator piston rod. The actuator piston rod has an end portion projecting outwardly from the actuator cylinder. A link pivotally couples the end portion of the actuator piston rod to the latch arm flange. The end portion of the actuator piston rod is also coupled to the actuator guide flange such that the actuator guide slot guides the movement of the actuator piston rod during extension and retraction of the actuator piston rod. In this example, extension of the actuator piston rod shifts the latch arm to the first position and retraction of the actuator piston rod shifts the latch arm to the second position.

As yet another aspect of an embodiment, the shock absorber may be adapted to provide a non-linear dampening force to the seat to dampen seat vibrations. For example, the dampening force may be constant for a first range of movement of the seat in response to vibrations from a home position of the dampening piston and increasing for certain movements of the dampening piston in excess of the first range of movement.

In accordance with another embodiment, first and second latch arms are pivoted to the housing and are disposed at opposite sides of a cylinder disposed substantially within the housing. These latch arms each have a central portion and first and second end portions. The latch arms each pivot about an axis through a central portion of the latch arm. The first end portion of each latch arm includes a latch surface and the cylinder has an exterior with an elongated latch gripping surface. A fluid actuator is coupled to the second end of each of the arms by respective links. Extension and retraction of the fluid actuator, and more particularly of an actuator piston rod, is translated through the links into pivoting motion of the first and second latch arms between respective first positions in which latch surfaces of the latch arms engage the latch gripping surfaces of the cylinder and second positions in which the latch surface and latch gripping surfaces are disengaged.

The present invention is directed toward novel and nonobvious features of a vibration dampener, both individually and collectively, as set forth above and as additionally set forth in the drawings and description which follows.

BRIEF DESCRIPTION OF THE DRAWINGS

FIG. 4 is a perspective view of one form of vibration damper usable in the embodiment of FIG. 1 looking generally toward the front of the vibration damper.

FIGS. 5 and 6 are side elevation views of the vibration damper of FIG. 4, showing the vibration damper in respective latched and unlatched positions.

FIG. 10A is a graph illustrating an example of the non-linear dampening force which may be applied by the dampening cylinder of FIG. 10.

FIG. 16 is an enlarged vertical sectional view of the latch used in the embodiment of FIG. 15 with the latch shown in a latched state.

FIG. 16A is a cross-sectional view of the latch of FIG. 16 taken in the direction of arrows 16a—16a and illustrating the operation of the latch to grip a rod passing through the latch.

FIG. 17 is a vertical sectional view through the latch of FIG. 15 showing the latch in an unlatched position to permit the passage of the rod through the latch.

FIG. 18 schematically illustrates an alternative embodiment of a seat suspension system in accordance with the present invention.

FIGS. 22A, 22B, 22C, 22D and 22E illustrate in greater detail one suitable valve actuated by a single lever for simultaneously causing the unlatching of a latch and seat height adjustment.

DETAILED DESCRIPTION

Figure 1:
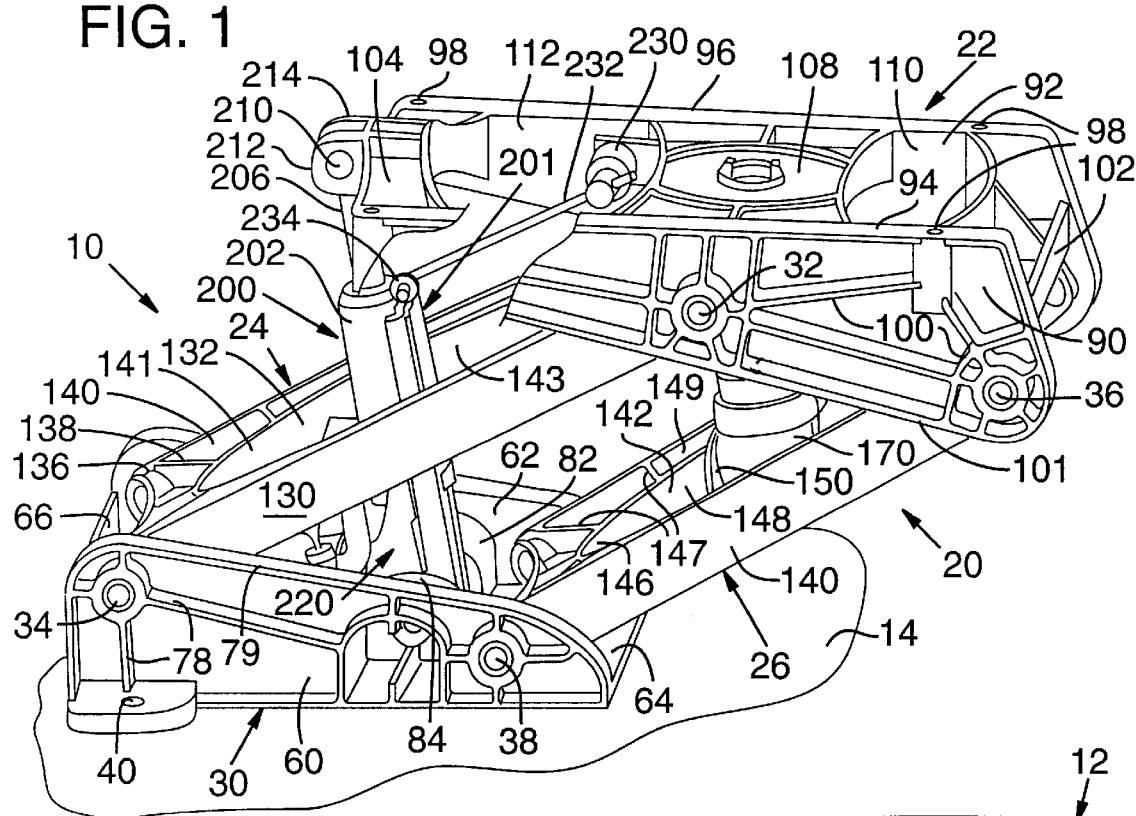
FIG. 1 is a partially broken away perspective view of one embodiment of a seat suspension system in accordance with the present invention in a partially elevated state.
Figure 2:
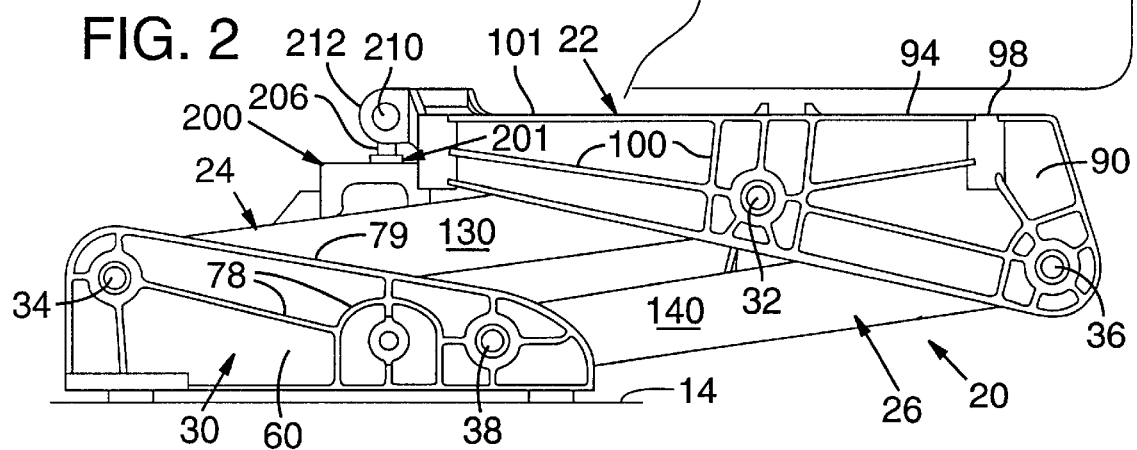
FIG. 2 is a side elevation view of the seat suspension system of FIG. 1 in a lowered position relative to FIG. 1 and illustrating a portion of a seat supported by the seat suspension system.
Figure 3:
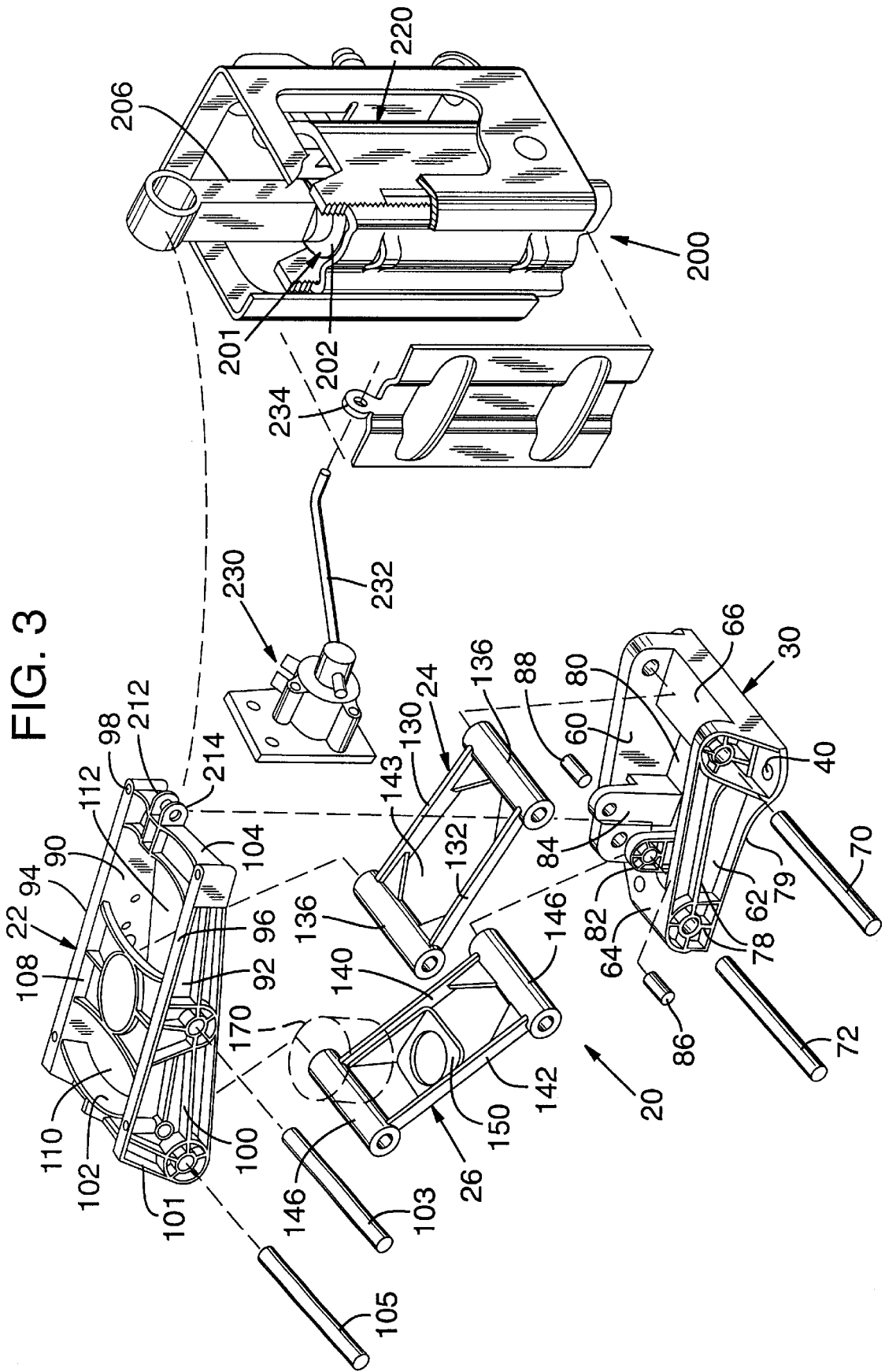
FIG. 3 is an exploded view of the seat suspension system similar to the system of FIG. 1.

FIGS. 1–3 illustrate one form of a seat suspension system 10 for supporting a seat 12 (a portion of which is shown in FIG. 2) for raising and lowering the seat in elevation relative to a floor 14 of a vehicle within which the seat suspension system is positioned. For example, the seat suspension system 10 may be mounted to the floor of a truck. In such a case, vibrations imparted to the truck during travel over a road surface can cause some vibration of the floor 14 and also of the supported seat 12. Consequently, it is desirable in such applications to dampen the road vibrations.

The illustrated seat suspension system 10 includes a seat support, one form of which is generally indicated at 20, which is raisable and lowerable to support the seat at various elevations relative to the floor 14 of the vehicle. The illustrated seat support includes a seat supporting member 22 to which the seat 12 is mounted (FIG. 2). First and second link elements 24, 26 are pivotally connected at their upper end portions to the support member 22 and at their lower end portions to a base member 30. More specifically, link member 24 is pivoted at its upper end portion to support member 22 for pivoting about a first pivot axis 32 extending transversely through the seat support member. In addition, the lower end portion of link member 24 is pivoted to the base 30 for pivoting movement about a transverse axis 34 which is parallel to the axis 32. In addition, link member 26, which in the illustrated form is positioned below link member 24, has an upper end portion pivoted to the seat support member 22 for pivoting about a transverse axis 36. The link member 26 also has a lower end portion pivoted to the base 30 for pivotal movement about an axis 38. Axes 32, 34, 36 and 38 in the illustrated form are parallel to one another. Consequently, a parallelogram type support is provided for the seat member 22. The axes 32–36 may be positioned such that a line through axes 32, 34 is parallel to a line through axes 15 36, 38 in a true parallelogram support. However, the axes 32–38 may be positioned such that the line through axes 32, 34 is not parallel to the line through axes 36,38;

for example, to control seat motion as explained below in connection with FIGS. 3A–3D.

Base 30 is adapted for mounting to the floor 14 of the vehicle. For example, a plurality of fastener receiving openings, one being indicated at 40, are provided for receiving fasteners which secure the base 30 in place. Alternatively, base 30 may be eliminated with link members 24, 26 being pivoted directly to the floor or other vehicle supports. Also, the base 30 may be adapted for mounting to a wall surface of a vehicle instead of the floor 14. Nevertheless, the illustrated seat support is advantageous because the floor of the vehicle provides stable support for the seat support 20 and the seat support can be installed as a modular unit.

As best seen in FIG. 3, the illustrated base 30 includes first and second upright side elements 60, 62 interconnected by front and rear transverse cross-piece elements 64, 66. Openings are provided in the respective side elements 60, 62 for receiving 30 pivot pins 70, 72 which pivot the lower end portions of the respective link members 24, 26 to the base 30 for pivoting about axes 34 and 38. To reduce the weight of the overall construction, the upright elements 60, 62 may be of a generally hollow construction with a plurality of reinforcing ribs, some of which are indicated at 78, and a perimeter flange 79 being provided for reinforcing these elements and also the openings through which the pins 70, 72 extend. The central region of base 30 may also be provided with a void 80 for further weight reduction purposes. In addition, as explained more fully below, the base 30 may include upright vibration damper supporting bracket elements 82, 84 to which a vibration damper 200 is interconnected, such as by pivot pins 86, 88. The axis through pins 86 and 88 in the illustrated embodiment is parallel to the axes through the pins 70, 72. The pins 70, 72 may, as shown in FIG. 1, comprise four short pins instead of longer pins transversing the width of the base Although other materials may be used, typically the base 80 is of cast metal such as aluminum. Plastics and other durable materials may alternatively be used for the base. The base may also be of fabricated sheet steel. In addition, the base may take other forms.

The support member 22 shown in FIGS. 1–3 includes first and second upright side flanges 90, 92 having respective elongated spaced-apart planar seat mounting surfaces 94, 96, which are generally parallel to one another. The mounting surfaces include plural fastener receiving openings, some being indicated at 98 in FIG. 1, for use in mounting the seat 12 to the seat support member 22. Like base side components 60, 62, the seat support side components 90, 92 may be generally hollow with a plurality of reinforcing ribs, some being indicated at 100 in FIG. 1, and a perimeter flange 101 or lip for reinforcing the side elements and the pivot axis defining openings. Pins 103, 105 (FIG. 3) pivot the respective upper end portions of link members 24, 26 to the seat support member 22. As shown in FIG. 1, four such pins may be used, one at each corner of the interconnected seat support 20. Also, front and rear cross components 102, 104 are provided to interconnect the side flanges 90, 92. A central platform 108 may also be provided between these two flanges. Voids 110, 112 between these cross pieces further reduce the weight of the illustrated seat supporting member 22. The cross pieces 102, 104 may include appropriate reinforcing ribs as shown. Like base 30, the seat support member 22 may be of a durable material and may be cast of steel. Thus, base 30 and seat support member 22 may each be of a monolithic one-piece homogenous unitary cast structure.

The seat support member 22 may be eliminated with elements such as link members 24, 26 being connected directly to the seat. In such a case, the seat 12 would typically be rigidified at its base. However, by making seat support 20 a combination of base 30, links 24 and 26 and an upper seat support member 22, a modular construction results as the seat can be separately manufactured and installed to the seat support member 22 at a later time.

The link member 24 may include first and second side elements 130, 132 with transverse cross-piece portions 136 (one of which is shown in FIG. 1). These elements together form a platform-like, generally rectangular link member. For weight reduction purposes, the link member may be generally hollow with reinforcing ribs such as indicated at 138 in FIG. 1 and interior and exterior flanges 140, 141. Flange 140 may bound an enlarged opening 143 through the link member 34 for accommodating the vibration dampener 200, as explained below. The lower link member 26 may be similarly constructed with side elements 142, 144 and transverse cross-piece portions, one of which is shown at 146 in FIG. 1. The link member 26 may also be generally hollow with reinforcing ribs (some being indicated at 147) extending between interior and exterior flanges 148, 149. The central portion of link member 26 is generally hollow, although the illustrated link member 26 has a central cross-piece such as platform 150 for supporting an air spring as explained below.

As can be seen in FIG. 1, the base side members 60, 62 may be tapered with an increasing height from front to rear of the seat support 20. Also, pivot axis 34 may be positioned rearwardly and above pivot axis 38. Similarly, the side elements 90, 92 of seat support member 22 may be reduced in height from front to rear of the seat support 22 and may also accommodate a pivot axis 32 positioned above and rearwardly of the pivot axis 36. Consequently, as the seat support is pivoted downwardly (shown moving from FIG. 1 to FIG. 2), the seat support member 22 shifts primarily downwardly with the surfaces 94, 96 remaining substantially level. Conversely, when the seat support is raised (moving from FIG. 2 to FIG. 1), the seat supporting surfaces 94, 96, and thereby the seat 12, moves primarily upwardly, with the seat remaining substantially level.

The link members 24, 26 may take different forms. For example, the link members 24 and 26 in FIG. 3 are of a somewhat different structure, with corresponding elements being assigned the same numbers., This illustrates the fact that the structure of link elements 24, 26 may be varied, with an alternative form being shown in FIG. 3. The link members 24, 16 may also, for example, comprise individual spaced-apart arms at opposite sides of the seat. The seat support 20 may also take a variety of forms, although the form illustrated in FIGS. 1–3 offers a number of advantages. For example, a scissors-type seat support mechanism may be used, as well as other seat supports capable of raising and lowering the seat.

With reference to FIGS. 3A–3D, and with a number of the components of the seat support system, such as a seat height adjuster and latch (if used) eliminated for convenience, first and second link members 24, 26 are shown pivotally coupled at their lower end portions to base 30 and at their upper end portions to seat supporting member 22. The centers of the pivots 38, 36 are indicated respectively by the numbers 1 and 2, and thus correspond to the pivot axes through pivots 38 and 36. Similarly, the centers of the pivots 34, 32 are indicated respectively by the numbers 3 and 4, which thus correspond to the pivot axes through pivots 34, 32. For convenience in this description, the first pivot axis thus corresponds to number 1, the second pivot axis thus corresponds to number 2, the third pivot axis thus corresponds to number 3, and the fourth pivot axis thus corresponds to number 4.

In these figures, an X-Y coordinate system is indicated, with the X axis being horizontal and in this case parallel to the illustrated floor 14. In addition, the Y axis of this coordinate system is vertical. The coordinate system is located so that both the X and Y axes intersect first pivot 1 and thus first pivot 1 has coordinates (0, 0) in this X-Y coordinate system.

Figure 3A:
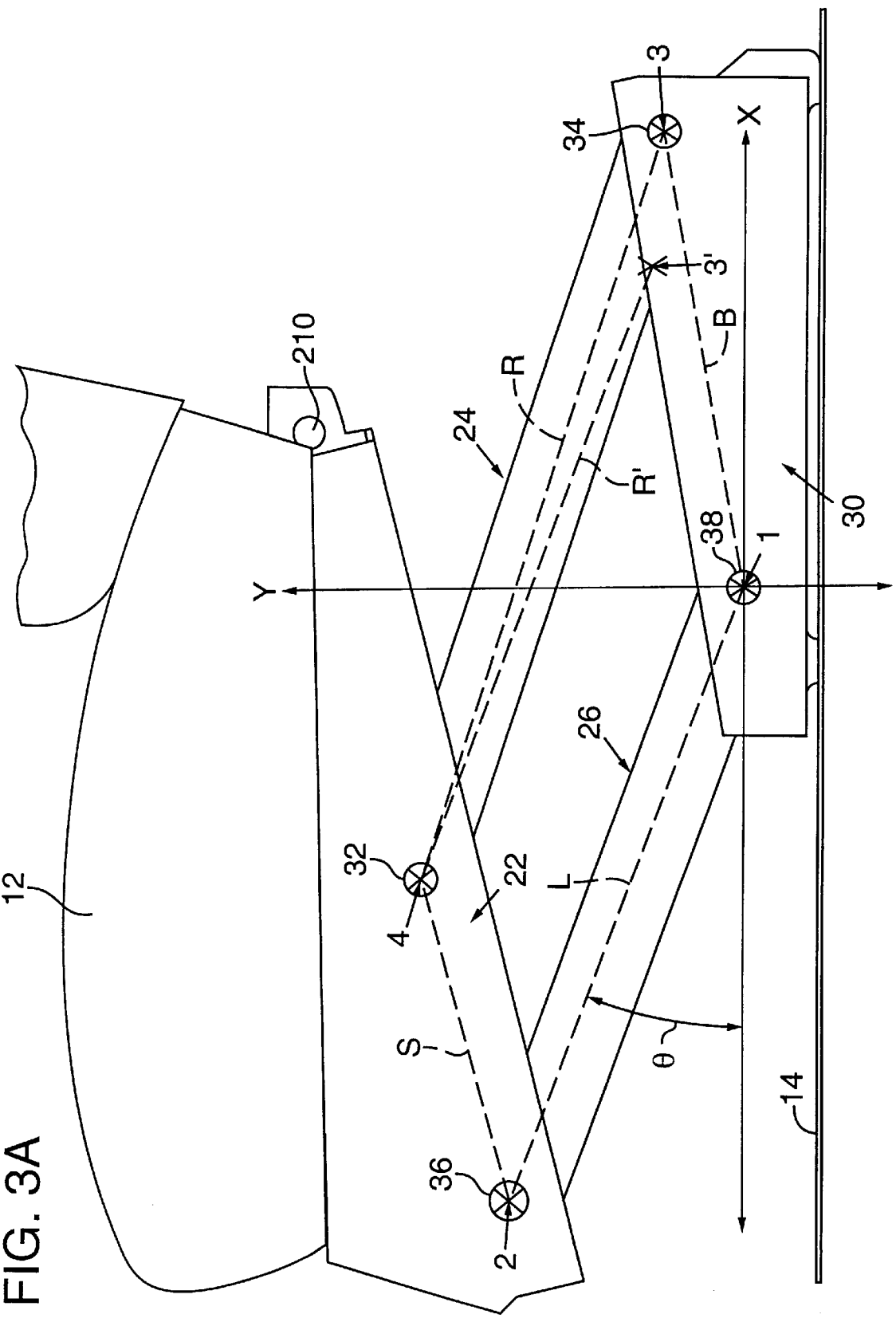
FIG. 3A is a schematic illustration of one form of a seat support illustrating several specific pivot axis points for link members used in this support relative to an X-Y axis coordinate system.

As the links 24, 26 are pivoted clockwise in FIG. 3A, the seat 12 is raised. Conversely, when the links are pivoted counter-clockwise in FIG. 3A, the seat 12 is lowered. In these figures, the seat support is shown with the line segment L extending from the first pivot 1 to the second pivot 2 and at an axle of θ relative to the X axis, with θ being 20.3 degrees. Obviously, the angle θ changes as the arms 24, 26 are pivoted to new locations. In FIG. 3A, the line segment R extends from the third pivot 3 to the fourth pivot 4, the line segment B extends from the first pivot 1 to the third pivot 3, and the line segment S extends from the second pivot 2 to the fourth pivot 4.

In the construction illustrated in FIG. 3A, the links 24, 26 are of unequal length. That is, the length or distance R between the third and fourth pivots 3, 4 is different from the length or distance L between the first and second pivots 1, 2. More specifically, the distance R is greater than the distance L. Consequently, the FIG. 3A construction comprises an unequal arm length parallelogram type support. In a specific embodiment, the distance R is from about twelve percent to about twenty percent greater than the distance L and assists in controlling the motion of the seat. Assume the pivot 3 is shifted to the location indicated by 3' and thus segment R is shifted to R'. In this latter case, R' is equal to L in length and R' is parallel to L, providing a true parallelogram support. Although this can be done, as explained below the resulting motion of selected portions of a seat occupant's body have greater horizontal components of motion than if the illustrated FIG. 3A unequal parallel arm support is used.

Again referring to FIG. 3A, in this illustrated construction, the third pivot axis 3 is at an elevation which is above the elevation of first pivot axis 1. Also, in this illustrated construction, the fourth pivot axis 4 is positioned above and rearwardly of the second pivot axis 2. When the seat of this figure is in a raised position, the first and second link members 24, 26 are angled forwardly and upwardly relative to the floor of the vehicle. Furthermore, with the constructions shown in FIGS. 3B and 3C, the absolute value of the slope of line L relative to horizontal is greater than or equal to the absolute value of the slope of line R relative to horizontal when the seat is supported in various raised positions. Also, a plane extending upwardly through third and fourth pivots 3, 4 intersects a plane extending upwardly through first and second pivots 1,2 at a location which is above the floor of the vehicle when the seat is raised.

The pivot axes may be located relative to one another according to the formula L<(S+R−B). In this formula, L is the distance between the first and second pivot axes, S is the distance between the second and fourth pivot axes, R is the distance between the third and fourth pivot axes, and B is the distance between the first and third pivot axes.

Figure 3B:
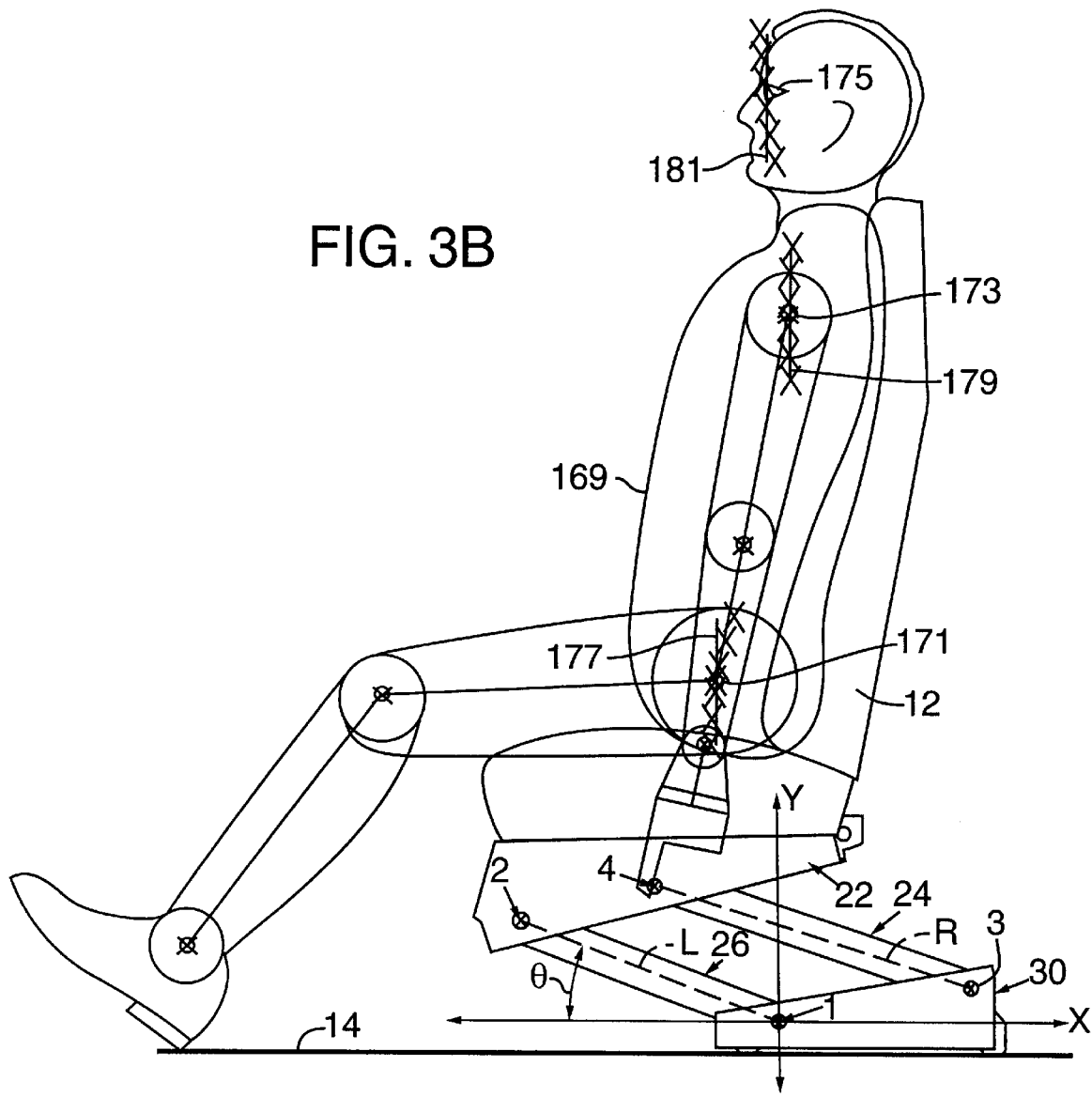
FIG. 3B is a schematic illustration like that shown in FIG. 3A, but also showing a seat occupant and the path of travel of selected portions of the body of the seat occupant in response to vibrations, with the pivot axis points shown in FIG. 3B like those shown in FIG. 3A.

In the specific example shown in FIGS. 3A and 3B, and with θ at 20.3 degrees, the coordinates of pivot 1, as previously mentioned, are (0, 0) on the illustrated X-Y coordinate system; the coordinates of pivot 2 in millimeters are (−347.7, 128.5); the coordinates of pivot 3 are (259.6, 42.5); and the coordinates of pivot 4 are (−165.4, 177.8).

The location of these pivots in this illustrated embodiment may be selected such that the movement of a selected portion of a seat occupant's body in response to seat vibrations is confined to movement in a substantially vertical direction. For example, as best seen in FIG. 3B, with the specific coordinates set forth above, movement of various body points of a seat occupant 169 are shown. Specifically, with the seat at a selected elevation corresponding to the given θ and occupant 169 sitting on the seat and the seat being stationary, the position of the occupant's hip point 171, shoulder point 173, and eye point 175 are shown. For reference purposes, vertical line segments 177, 179 and 181 are shown passing through the respective hip point 171, shoulder point 173, and eye point 175. In response to seat vibrations, as explained below, the seat may move both upwardly and downwardly from the static position. Correspondingly, the respective hip point 171, shoulder point 173, and eye point 175, also move upwardly and downwardly. The X's shown adjacent line 177 indicate points through which the hip point 171 passes as it moves upwardly and downwardly in response to vibrations. Similarly, the X's adjacent to line 179 indicate the path followed by the shoulder point 173 as the seat moves upwardly and downwardly. Finally, the X's adjacent to line 181 indicate the path followed by eye point 175 as the seat moves in response to vibrations.

In FIG. 3B, the shoulder point 173 travels more closely along a vertical line than either the eye point or hip point. That is, the shoulder point is confined to move in a substantially vertical direction.

More specifically, assume that the total range of movement in response to vibration between the lower extreme and the upper extreme is called the suspension stroke. By substantially vertical motion, it is meant motion having a horizontal component which is no more than about seven percent of the length of the suspension stroke from vertical. For example, in FIG. 3B, with the pivots having the coordinates shown and with the suspension stroke (the total vertical motion of the seat in response to vibration) being 165 mm, the maximum deviation of hip point 173 from vertical line 179 is about 6.6 mm, or about four percent of the suspension stroke.

Since very little off-vertical motion occurs at this location, less undesirable rubbing of a three-point shoulder strap on the occupant's shoulder at this location takes place. Also, for occupant's prone to travel sickness, it is desirable to have less elliptical or off vertical movement of the stomach and inner ear of such occupants. By confining the shoulder to substantially vertical movement, a compromise is achieved. That is, the inner ear more closely moves in a vertical direction than would be the case if seat pivot locations were optimized to confine the motion of the stomach to a substantially vertical direction. In addition, the stomach moves more vertically than would be the case if the pivot locations were optimized to confine movement of the eye or inner ear of the occupant to substantially vertical movement.

Figure 3C:
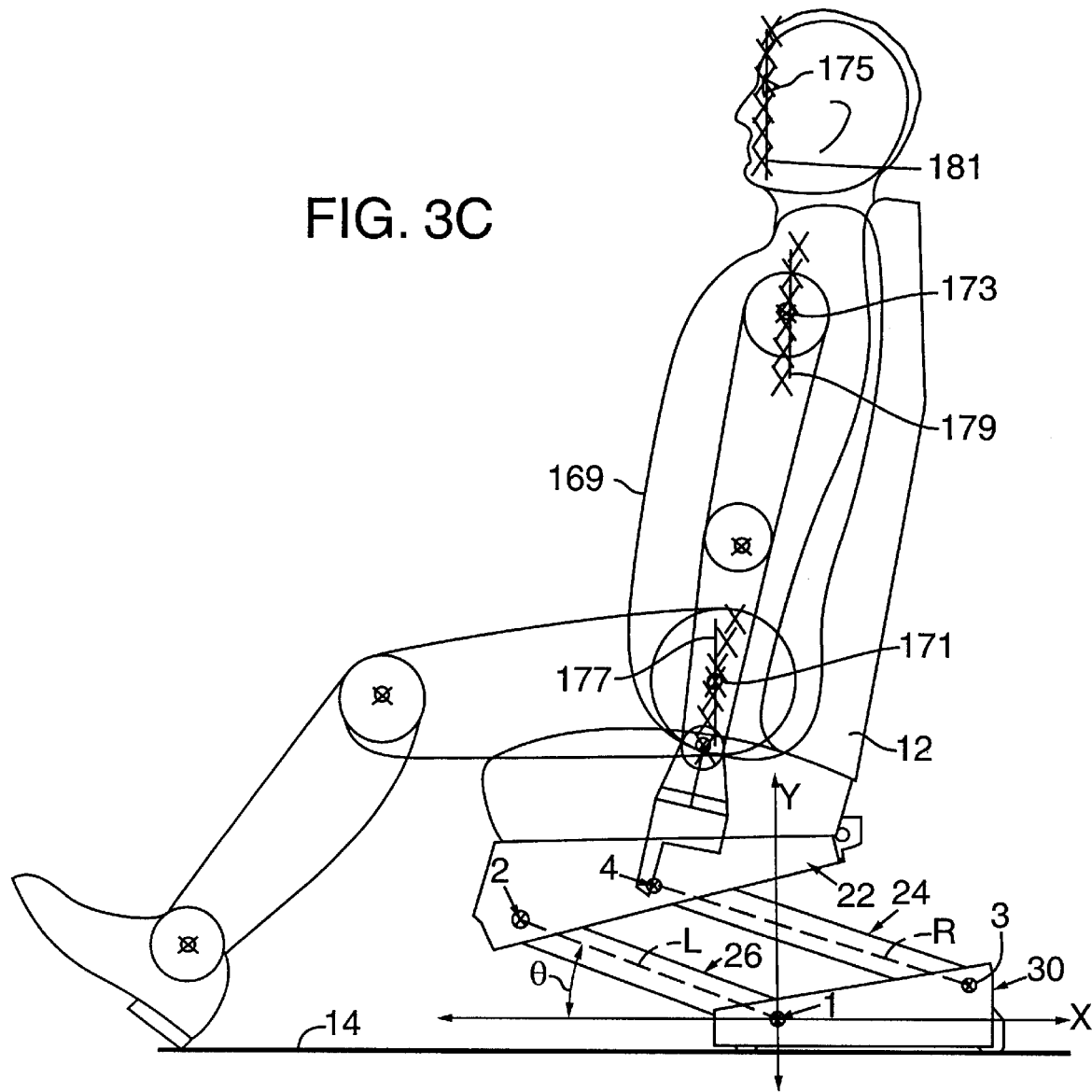
FIG. 3C is similar to FIG. 3B except that the pivot axis points are located at different coordinates, this figure showing the effect of adjusting the coordinates on the motion of various body parts of the seat occupant.

FIG. 3C illustrates an example where the pivot axis points 1–4 are selected to minimize the horizontal component of movement of the eye point 175 of the seat occupant 169. As can be seen in FIG. 3C, the shoulder point 173 has greater horizontal components of movement than the horizontal components of movement of shoulder point 173 in the case where the pivot axis points 1–4 are positioned as shown in FIG. 3B. More specifically, in FIG. 3C, θ again is at 20.3 degrees. In addition, the coordinates of pivot 1 are (0, 0); the coordinates of pivot 2 are (−364.8, 35.9); the coordinates of pivot 3 are (259.6, 42.5); and the coordinates of pivot four are (182.3, 49.2). With these specific exemplary coordinates, the maximum deviation of eye point 175 from vertical line 181 is 10 mm, or about six percent of the entire 165 mm suspension stroke.

In these examples, the vertical lines 179, 181 are located to intersect the respective shoulder point 173 and eye point 175 when the seat is in the static position supporting an occupant with no seat vibration. Thus, the phrase "substantially vertical motion" is defined to mean motion of no more than about ten percent and most preferably no more than seven percent from vertical over the entire suspension stroke.

Figure 3D:
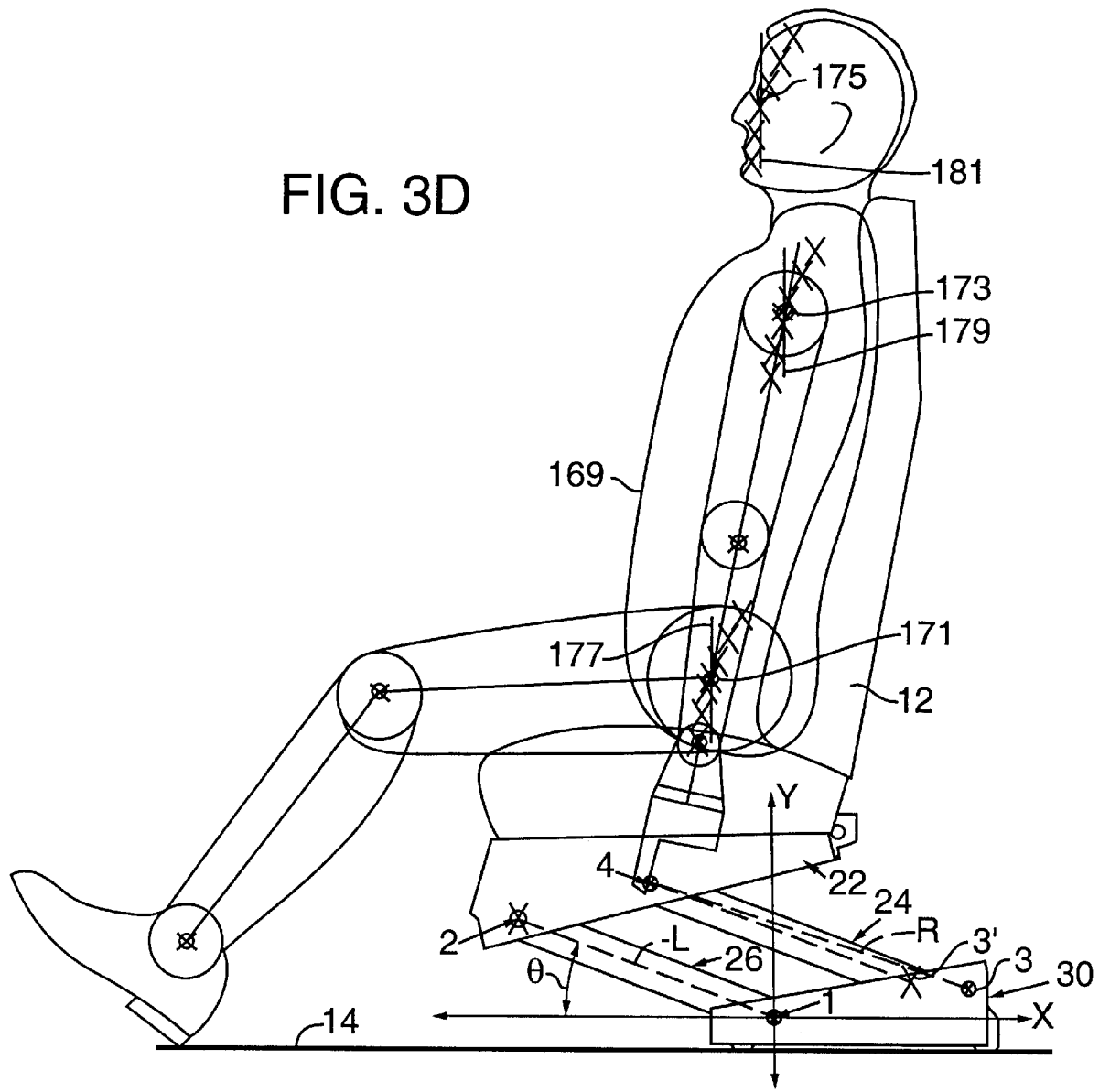
FIG. 3D is like FIG. 3C with the pivot axis points at a location which defines a true parallelogram.

In comparison, FIG. 3D shows the seat support with the third pivot at 3' to provide a true parallelogram support. In the FIG. 3D example, with θ again equal to 20.3 degrees, the coordinates of the pivots in millimeters are as follows: pivot 1 at (0, 0); pivot 2 at (−347.4, 128.5); the third pivot 3' at (182.3, 49.2); and the fourth pivot at (−165.4, 177.8). In this case, with a suspension stroke of 165 mm of vertical motion, the shoulder point (as well as the hip and eye points) have a maximum deviation which is understood to be about 48.5 mm (about twenty-nine percent) from vertical.

Thus, the modified unequal parallelogram supports of FIGS. 3B and 3C are examples illustrating the selection of pivot axis locations to confine selected portions of an occupant's body to a more vertical direction. Moreover, it should be noted that the vertical motion achieved by the shoulder point in the FIG. 3B example does not deviate significantly from precise vertical motion of the shoulder achieved with some conventional scissors style seat supports.

It should be noted that the locations of pivots 32–36 may be varied. In addition, as previously mentioned, in some embodiments of a seat suspension system, the modified or true parallelogram type support may be replaced with scissors or other types of support mechanisms.

A seat height adjuster is used to raise and lower the seat 12 between various elevations relative to the floor 14 and to a selected elevation. In general, a mechanism may be employed which moves seat support 22 or either of the link members 24, 26 about their respective pivots. These mechanisms may, for example, comprise hydraulic or pneumatic activated screw jacks or other mechanisms. As a specific example, an air spring 170 (see FIGS. 1 and 3) may be used for this purpose. The illustrated air spring may, for example, be from the "Airide Springs" product line from Firestone of Carmel, Calif. The illustrated air spring 170 is supported on the platform 150 of link member 26 beneath the seat support member 22 and engages the undersurface of platform 108 of member 22. Upon inflation of air spring 170, the seat support member 22 and seat 12 is shifted upwardly. In contrast, upon deflation of air spring 170, the seat support member 22, and thereby the supported seat 12, shifts downwardly. A seat height controller may be used to control the air pressure delivered to and removed from the air spring 170 to thereby adjust the height of the seat to a selected elevation. The seat height is adjustable by the seat height adjuster between an uppermost elevation and a lowermost elevation which is established by the mechanical limits of the seat suspension system 10. For example, although variable, the seat may be adjustable in elevation from a lowest position which positions the hip point 437 mm above the floor 14 to a highest hip point position which is 537 mm above the floor, for a total elevation adjustment of 100 mm (about four inches. The term "hip point" refers to the location where a typical driver's hip joint is positioned when the driver is seated in the seat. The seat height adjuster, such as air spring 170, allows the supported seat to move in response to vibrations, for example from the road surface. This provides for a more comfortable ride.

The vibration dampener 200 is provided to dampen the vibrations of the seat. In the form illustrated in FIGS. 1–3, the vibration dampener includes a shock absorber or dampening cylinder 201 with an external housing 202 and a dampening piston therein (one example being described below in connection with FIG. 10). The dampening piston is coupled to a piston rod 206. The piston rod may be of circular cross-section or of any other cross-section. For example, FIGS. 3–9 show a shaft 206 having a square cross-section. The lower end portion of the vibration dampener 200 is, in the illustrated embodiment, pivoted to the respective elements 82, 84 of base 30 rearwardly of pivot 38. The upper end portion of the vibration dampener in this form, and in particular the upper end of rod 206, is pivoted at 210 (FIG. 1) rearwardly of pivot 32 and between respective ear flanges 212, 214 which project rearwardly from cross-piece portion 104 of the seat support member 22. The dampening piston is biased towards a first or home position such that the vibration dampener, when engaged to the seat support 20, dampens movements of the dampening piston away from the home position to thereby dampen corresponding vibrations of the seat 12. In this specific embodiment, the dampening cylinder is supported for selective movement relative to the floor 14 of the vehicle. Consequently, the elevation of the first or home position is adjustable to correspond to adjustments in the selected elevation of the seat. More specifically, in this illustrated form, each time the seat height adjuster operates to adjust the height of the seat, the elevation of the dampening cylinder and thereby of the home position is adjusted. More specifically, the illustrated seat height adjuster and vibration damper cooperate to automatically and simultaneously adjust the elevation of the first position of the dampener with changes in the selected elevation of the seat.

The illustrated vibration dampener 200 includes a latch mechanism 220 which selectively engages and releases the dampening cylinder 201. When released, the dampening cylinder 201 is free to move relative to the latch. That is, as the seat is raised, the dampening cylinder 201, because it is coupled to seat member 22 at the upper end of rod 206, is raised the same distance as the seat. Consequently, the home position of the dampening piston within the housing 202 remains at a constant location within the cylinder, yet the elevation of the home position changes with the changes in elevation of the cylinder 201.

Once the seat height is at a desired elevation, the latch mechanism 220 may be operated to re-engage the dampening cylinder 201. When re-engaged, the cylinder is in a fixed position relative to the seat support 20 and the dampening cylinder applies a dampening force to the seat. That is, vibrations in the seat cause corresponding vibrations in rod 206 which are dampened by the movement of the dampening piston within the cylinder 202. Other ways of adjusting the elevation of the home position may also be used. For example, the cylinder may be supported by a jack or other mechanism which raises the cylinder an amount which corresponds to the change in seat elevation without decoupling the cylinder. Various forms of latch mechanisms 220 may also be used, some specific examples of which are explained in greater detail, below.

The latch 220 may be operated to release the dampening cylinder during the entire time the seat height is adjusted or only during portions of such time. The vibration dampener is thus adapted to selectively relieve and apply a dampening force in these embodiments in which the dampening cylinder is latched and released. Furthermore, with this approach, the position within the vibration dampening cylinder 201 need not extend and retract over the entire range of seat height adjustment controlled by the air spring, 170 or other seat height adjuster. In a specific example, the dampening cylinder 201 may be designed to allow movement of the dampening piston a total of about sixty-five millimeters (about 2.5 inches). Although this may be varied, this compares to a total seat height adjustment in this example of about 100 mm (about four inches). Furthermore, a vibration dampener may be used which applies a variable dampening force to seat vibrations, including a dampening force which varies non-linearly with the magnitude of seat movements in response to vibrations. For example, the applied dampening force may be higher for a more extreme movement in response to seat vibration than applied in the case of a lesser movement in response to seat vibration and may be varied non-linearly for such movements between such movements. More specifically, the applied dampening force may be constant for limited motions from a home position and increase with more extremes in motion from the home position. This is facilitated by a design in which the home position of the dampener is shifted with changes in elevation of the seat.

Assume the seat has been moved to an elevation which is three inches higher than the previous elevation to an elevation which is twelve inches above the floor of the vehicle. With the illustrated design, the home position of the dampening cylinder may also be shifted three inches. If the seat then moves downwardly a certain amount (for example, thirty millimeters), in response to a seat vibration, a first dampening force may be applied to such motion. If thereafter the seat moves downwardly thirty-five millimeters from the home position, a greater dampening force may be applied. The dampening force may be varied non-linearly with deviations from the home position. Upward changes in seat elevation in response to vibrations can be dampened in a similar manner. If the home position had not been changed, the seat ride would no longer be the same, at least for given movements in response to vibration if a non-linear dampening force were being applied. That is, in this specific example, if the home position remained fixed and the seat elevation had been raised three inches, a further upward movement (e.g. one-half inch) in elevation of the seat in response to a vibration would now make the seat three and one-half inches from the home position. If a non-linear dampening force were being applied, this force would differ from the force being applied if the seat had not been raised and the seat were influenced by the same vibration, as in this case the seat would only be one-half inch from the home position. Thus, the illustrated seat suspension system facilitates the use of a non-linear dampening force. Furthermore, this type of seat suspension 10 permits the application of substantially the same dampening force immediately after a height adjustment as the dampening force provided immediately before the height adjustment.

The seat suspension system 10 of FIGS. 1–3 also includes an optional seat leveling feature. In operation, if the load on the seat is varied, for example, by an occupant getting up from the seat, the air spring 170 will tend to expand in response to this reduced load. As a result, seat support 22 is raised and also the supported seat 12. If the particular seat happens to be the driver's seat, the upper surface of the seat may engage or come very close to the undersurface of the vehicle steering wheel. When the driver returns and again sits on the seat, it can be difficult for the driver to fit his or her legs between the steering wheel and seat until after the driver's weight has been placed on the seat to again compress the air spring to move the seat back to its original position. In the illustrated embodiment, a seat position sensor may be used to detect motions of the seat which are outside the range of motions being dampened by the dampener. In response to detection of such out of range motion, the inflation of the air spring 170 is adjusted to return the seat toward the position it was in before the motion took place. In other words, when the driver leaves the seat and the seat rises, pressure on the air spring is relieved to bring the seat back toward the position it was in prior to the driver leaving the seat. Conversely, when the driver again sits on the seat and the seat tends to depress outside of normal dampening ranges, the air spring is inflated to again return the seat toward its home position.

In one illustrated form, the position sensor comprises a self-leveling valve 230 coupled by a link 232 to the vibration dampener 200. More specifically, the link 232 is coupled to a bracket 234 connected to the dampening cylinder 202. The link 232 is 10 slidably coupled to the valve stem of valve 230 to accommodate variations in the distance between the valve stem and bracket 234 during operation of the illustrated system. The illustrated valve 230 is a rotary leveling valve and has a dead zone corresponding to the movements by the seat in response to vibrations which do not result in self-leveling. For example, assume movements of twenty-five millimeters or less in extension and forty millimeters or less in compression of the dampening cylinder are dampened by the dampening cylinder. Most movements in response to vibration involve less than 10 mm in extension and 10 mm of compression. In some observations, over ninety percent (90%) of extensions and over ninety percent (90%) of compression were within this range. Thus, although variable, the dead zone may be set to permit movements of 10 mm extension and 10 mm compression. It is expected that movements in compression will deviate more from the home position. Thus, the dead zone in compression may be greater than the dead zone in extension, with 15 mm compression being a specific example. Once the dead zone motion is exceeded, this motion causes link 232 to operate the valve to commence inflation of the air spring 170 and raise the seat if the seat elevation has dropped below the dampening range. Conversely, the valve is operated to commence deflation of the air spring 170 to lower the seat in the event the seat elevation is raised beyond the range of motion being dampened. Although timers or other delays may be used to only respond to deviations of a significant duration, this option may be eliminated. Consequently, a momentary deviation outside the dead zone is minimized because little change in air spring inflation occurs during any such momentary deviation. As a specific example, valve 230 may be a Model 3107-1 leveling valve from GT Development of Seattle, Wash. Other position detection sensors such as from Wabco, Inc. or other sources may be used, although the illustrated approach is convenient and mechanically simple. When latch 220 is unlatched and the dampening cylinder is shifted from one position to the other in response to changes in the elevation of the seat, the link 232 shifts with the dampening cylinder and remains in the same relative position to the valve 230. Consequently, the valve 230 in the illustrated approach does not operate when the seat elevation is deliberately being adjusted by the air spring 170.

One form of suitable vibration dampening module 200 utilized in the embodiments of FIGS. 1–3 is illustrated and described below in connection with FIGS. 4–8. This form of vibration dampener 200 includes an outer housing 300 having pivot receiving openings 302, 304 through which pivot pins are inserted to pivot the housing to the respective ears 82, 84 of base 30 (FIG. 1). Consequently, the housing 300 (FIGS. 4–8) is free to pivot about an axis 306 and relative to the base member 30. The housing 300 may include cut-outs, such as indicated at 308 (FIG. 4) for weight reduction purposes. In addition, the housing 300 may define a guide slot 310 extending along the full length of one side wall 312 of the housing. The side wall 312 of the illustrated housing includes respective flanges 314, 316 which extend inwardly toward one another and define the guide slot 310 therebetween. The illustrated housing is generally rectangular in cross-section with a side wall 320 opposing side wall 312 and side walls 322, 324 interconnecting the side walls 320 and 312. The housing 300 may be stamped or otherwise formed from a durable material, with steel being a specific example.

A latch arm element 330 is pivoted to housing 300, for example by the same pivots which couple the housing to the base 30, so that the latch arm element 330 may pivot relative to the base.

Figure 7:
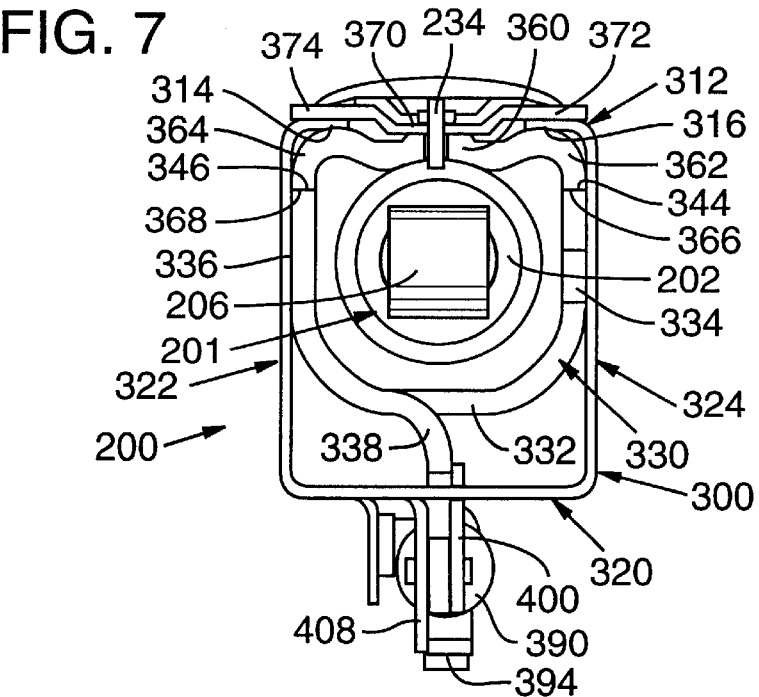
FIG. 7 is a top view of the vibration damper of FIG. 4.
Figure 8:
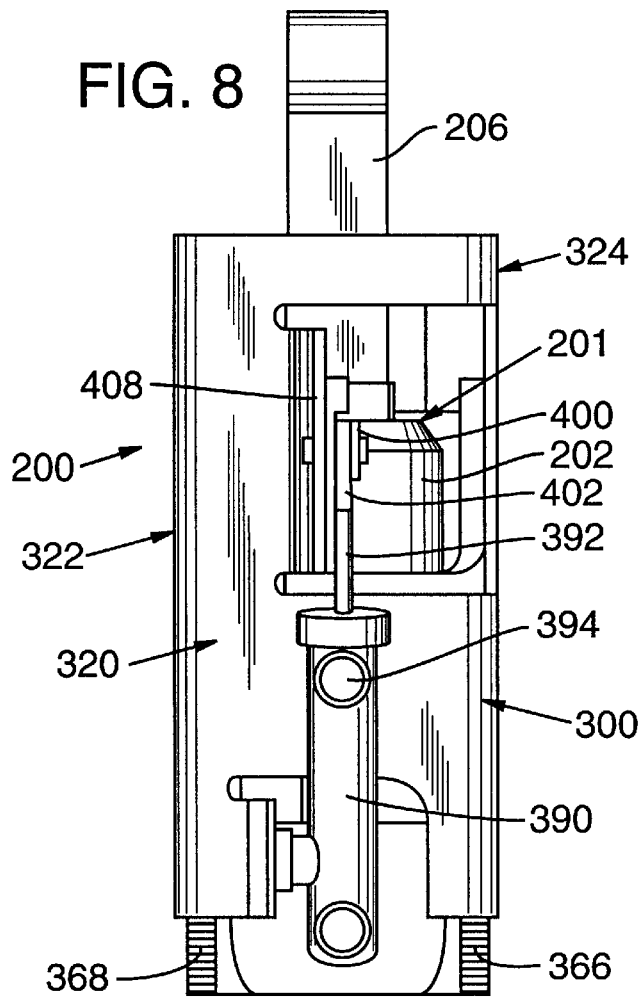
FIG. 8 is a rear elevation view of the vibration damper of FIG. 4.

As best seen in FIG. 7, latch arm element 330 may be generally U-shaped in cross-section, having a base portion 332 and first and second leg portions 334, 336. A latch actuator engaging flange 338 extends rearwardly from base 332 and, in this case, through an opening 340 (see FIGS. 5 and 6) through the wall 320. Each of the elements 334, 336 includes a respective latch surface 344, 346 which may comprise a friction enhanced surface. In the form shown in FIGS. 5 and 6, the latch surfaces comprise an elongated row of teeth 350. The latch 330 is selectively operable to couple and decouple the dampening cylinder housing 202 to the housing 300 and thus the dampening cylinder 201 to the base 30 (FIG. 1). More specifically, the cylinder housing 202 (FIGS. 4–8) includes a latch gripping surface which may be a friction enhanced surface which is selectively engaged by the latch 330. The latch gripping surface may be, as illustrated, provided by one or more members, such as a plate 360 (FIGS. 4–7) welded or otherwise secured to the exterior housing 202 of the cylinder 201. The plate 360 (see FIG. 7) includes first and second outwardly projecting side legs 362, 364. The leg 362 extends outwardly toward side wall 324 and turns inwardly along the interior of the wall 324 to extend toward wall 320. The distal edge 366 of leg 360 comprises a friction enhanced latch gripping surface, such as an elongated row of teeth which are selectively engaged or disengaged by the corresponding teeth 350 of the latch 330. Similarly, leg 364 extends outwardly toward the wall 322 and then turns to extend along the interior of wall 322 toward the wall 320. The leg 364 terminates at its distal edge provided with a latch gripping surface 368 which may also comprise a row of gripping teeth. A backup plate 370 is connected to the cylinder 202 and, more specifically, this connection is made through the plate 360. Backup plate 370 may include side flanges 372, 374 which are spaced from the respective legs 362, 364 as shown in FIG. 7 to receive the wall portions 314, 316 of the wall 312 therebetween. Consequently, when latch 330 is released to free gripping surfaces 366, 368 from surfaces 344, 346, the cylinder may slide relative to housing 300. In this case, the movement of the cylinder guided by flanges 314, 316.

Referring to FIGS. 5 and 6, the illustrated vibration dampener 200 includes a latch actuator such as a pneumatic cylinder 390 having an internal piston (not shown) coupled to a piston rod 392.

A link 400 is pivoted to the distal end 402 of the rod and also at 404 to the flange 238. The distal end of the piston rod is also coupled to the housing 300 so that motion of the piston rod is guided. More specifically, as best seen in FIGS. 5 and 6, an elongated, generally upright slot 406 is provided in a flange 408 projecting rearwardly from housing 300. The pin which couples link 400 to the distal end of rod 392 at location 402 may also extend through the slot 406 such that the slot guides the motion of the piston rod.

With reference to FIG. 5, the latch actuator may be biased to extend the cylinder as shown in this figure to latch the dampening cylinder 200 to the housing 300. In operation of this embodiment, when the latch 330 is shown in the position of FIG. 5, the latch gripping teeth 344 engage the teeth 368 carried by the cylinder housing 202 and prevents changes in elevation of the cylinder housing 202 in relation to vibration dampener housing 300 and thus relative to the seat support 20. When in this position, the latch arm 334 has been pivoted in the direction of arrow 410 (clockwise in this figure) to engage the latch and latch gripping surfaces. When latched as shown in FIG. 5, the vibration dampener is operable to dampen vibrations of the seat. Conversely, in the event the elevation of the seat is to be changed in this embodiment by operation of the air spring 170, the latch 330 is unlatched. More specifically, fluid pressure is delivered to port 394 of actuator 390 causing the retraction of piston rod 392. This motion, guided by the slot 406, is coupled via the link 400 to the flange 338 and results in pivoting of the latch 330 in the direction of arrow 412 as shown in FIG. 6. As a result, the latch surface 344 is disengaged from the latch gripping surface 368. When in the disengaged state, the cylinder housing 202 raises or lowers as the seat height adjustment takes place. Consequently, dampening forces are not applied during seat height adjustment. Moreover, following seat height adjustment and re-engagement of the latch to the cylinder, in this example the same dampening force is applied to the seat as was applied immediately before the seat height adjustment took place. Although less advantageous, it is also possible to retain dampener cylinder 202 in a latched state during all or portions of the seat height adjustment (in which case the dampener would typically be operable over a broader range of motion). In this latter case, the dampener may be unlatched for shifting to the desired new position following all or portions of the seat height adjustment. However, by unlatching the dampener over the full seat height adjustment, the damper design can be optimized to dampen motion solely over a more limited range of motion rather than over the entire range of the seat height adjustment. As another alternative, although less preferred, the dampener cylinder 201 and/or the housing 300 may be carried by a mechanism which permits the entire assembly to move rather than coupling and decoupling the dampener cylinder. For example, the housing may be supported by a fluid actuated screw jack which adjusts the position of the housing and thereby the dampener to accommodate seat height adjustments.

Figure 9:
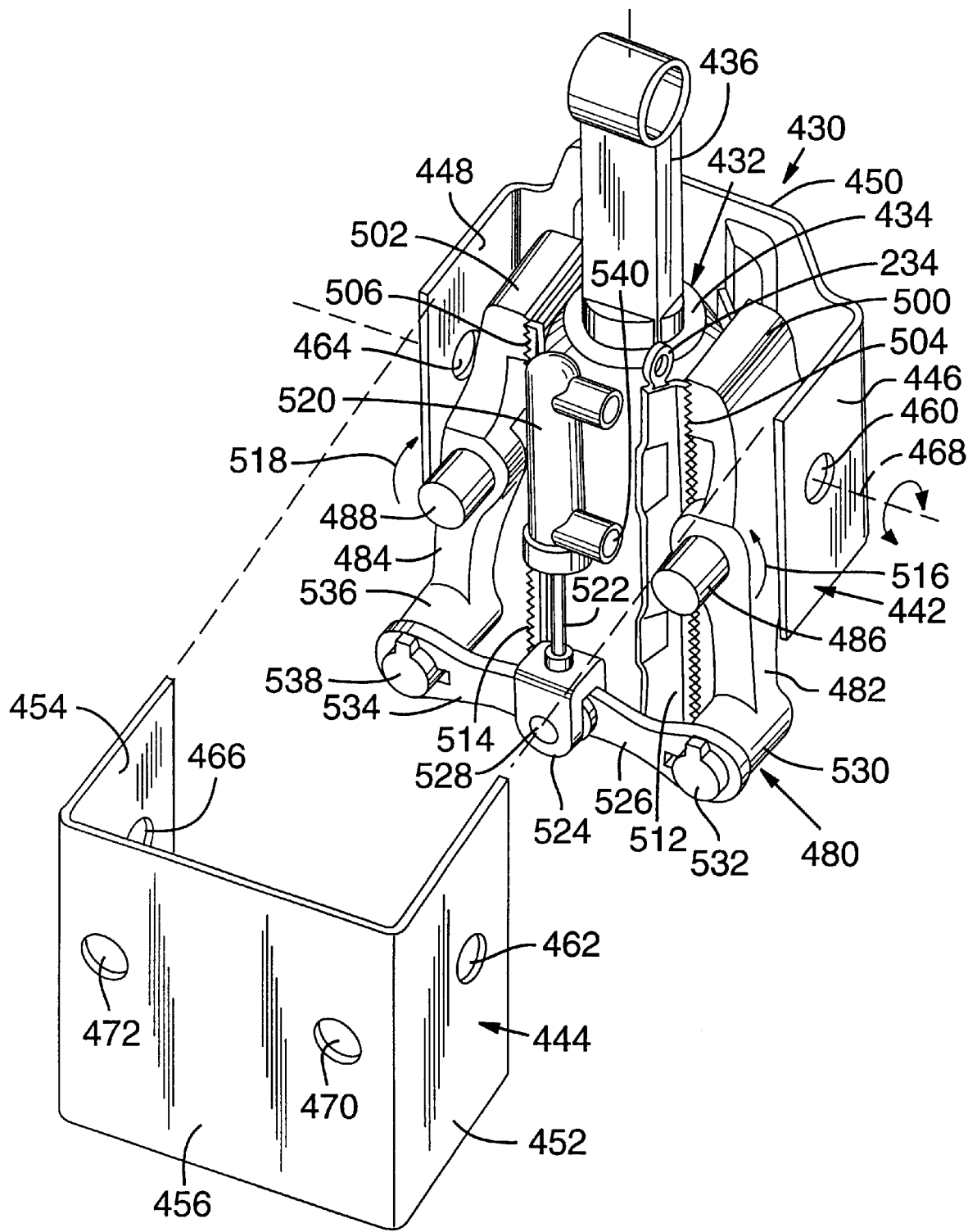
FIG. 9 is a partially exploded view of an alternative form of vibration damper usable in the embodiment of FIG. 1.

An alternative form of vibration dampening module 430 is shown in FIG. 9. Vibration dampener 430 includes a shock absorber or vibration dampener 432, which may be like dampener 201 of FIG. 4, having an exterior housing 434 and a rod 436. A piston (not shown) coupled to rod 436 dampens vibrations of the seat as the rod 436 moves. Vibration dampener 430 also includes an exterior housing, in this case formed of two generally U-shaped housing sections 442, 444. The housing section 442 includes side flanges 446, 448 and a rear flange 450. The housing section 444 includes side flanges 452 and 454, and a base or back flange 456 which interconnects the flanges 452, 454. When the housing is assembled, the housing section 444 nests within housing section 442 with the sets of leg flanges 446, 452 and 448, 454 abutting one another. When assembled, pivot receiving apertures 460, 462 through the respective flanges 446, 452 are aligned. In addition, pivot receiving openings 464, 466 of the respective flanges 448 and 454 are also aligned. A pivot axis 468 extends through these aligned openings. The housing is pivoted to the base 30 (FIG. 1) in the same manner as housing 300 with pivot axis 468 corresponding to apart the pivot axis 306 of the FIG. 4 embodiment. End flange 456 has a pair of spaced-apart openings 470, 472 which are aligned with a corresponding pair of openings (not shown) in the back wall 450 of housing section 442.

In the FIG. 9 embodiment, the latch 480 includes first and second elongated pivot arms 482, 484. Arm 482 includes a pivot pin portion 486 which is inserted through opening 470 when the module is assembled. An opposed pivot pin portion projects in the opposite direction through the corresponding opening in the back wall 450. In the same manner, arm 484 includes a pivot pin portion 488 which is pivotally received within the opening 472 when the module is assembled. A pivot pin portion opposed to portion 488 extends in the opposite direction from the opposite side of arm 484 into a pivot pin receiving opening through back wall 450. The arms 482, 484 are thus capable of rocking back and forth about the respective axes through pin portions 486, 488.

The upper end portions 500, 502 of the respective arms 482, 484 are each provided with a respective latching surface 504, 506. In the illustrated embodiment, the latching surfaces 504, 506 each face toward the cylinder 434. A friction enhanced latching surface, which may be roughened or may comprise a plurality of transversely extending teeth on the respective surfaces 504, 506, are provided for gripping the cylinder 434 when the cylinder is latched. The outer surface of the cylinder 434 includes or supports a friction enhanced latch gripping surface which may comprise a roughened surface. In the illustrated embodiment, the latch gripping surface comprises elongated rows of teeth extending in a direction parallel to the longitudinal axis of the cylinder as indicated at 512, 514 in FIG. 9, are welded or otherwise secured to the exterior of the cylinder 434. When arm 482 is pivoted counter clockwise as indicated by arrow 516 in FIG. 9 and arm 484 is pivoted clockwise as indicated by arrow 518 in this figure, the latching surfaces 504, 506 of the arms 482, 484 engage the teeth 512, 514 carried by the cylinder housing. When latched, the dampener 432 operates in the same manner as the dampener 200 of FIG. 4 when it is in an engaged or latched condition. Conversely, when arms 482 and 484 are pivoted in respective directions opposite to arrows 516, 518, surfaces 504, 506 become disengaged from the teeth 512, 514. As a result, the dampener 432 is free to move with the seat as the seat height is adjusted by the air spring 170 or other seat height adjuster.

An actuator such as a pneumatic cylinder 520 is provided for selectively pivoting the arms 482, 484 during operation of the vibration dampening module 430. Actuator 520 includes a piston rod 522 coupled to a U-shaped clevis 524. A first link 526 is pivotally coupled at one end portion to clevis 524 for pivoting about a pivot axis 528. The link 526 is also pivoted at its opposite end portion to a lower end portion 530 of arm 482 such that link 526 may pivot about a pivot axis 532. Similarly, a link 534 is pivoted at one end portion to the clevis 524 for pivoting about the axis 528. In addition, the opposite end portion of the link 534 is pivoted to a lower end portion 536 of arm 484 for pivoting about an axis 538. When piston rod 532 is fully extended (and the rod may be biased in this position), the arms 482, 484 assume the position indicated in FIG. 9 to latch the dampener 432 to the housing sections 442, 444 and thereby to the base 30 (FIG. 1) of the seat support 20. In contrast, the delivery of pressurized fluid to a port 540 of actuator 520 causes rod 522 to retract. In response, the links 526, 534 draw the lower end portions 530, 536 of arms 482, 484 inwardly. When this happens, the arms 482, 484 pivot in a direction opposite to arrows 516, 518 to release the surfaces 504, 512 and 506, 514 from one another so that the dampener 432 is free to move during seat height adjustment. The actuator 520 may be operated in the same manner as actuator 390 to accordingly control the latching and unlatching of vibration damper 430. One suitable form of actuator 390, 520 is a spring biased pneumatic cylinder Model BLC 2T2 from Sprague Controls of Canby, Oreg. Also, the bracket 234 for receiving a link, like link 232 in FIG. 1, may be mounted to cylinder housing 434 for reasons explained above in connection with FIG. 1.

The dampening shock absorbers 201 and 432 of FIGS. 4 and 9 may be conventional shock absorbers of the type which apply a linear dampening force in opposition to seat vibrations. Also, any suitable mechanism for dampening vibrations may be used in place of the piston containing dampening cylinders 201, 432. However, the illustrated shock absorbers may be of the type which applies a non-linear dampening force to seat vibration.

Figure 10:
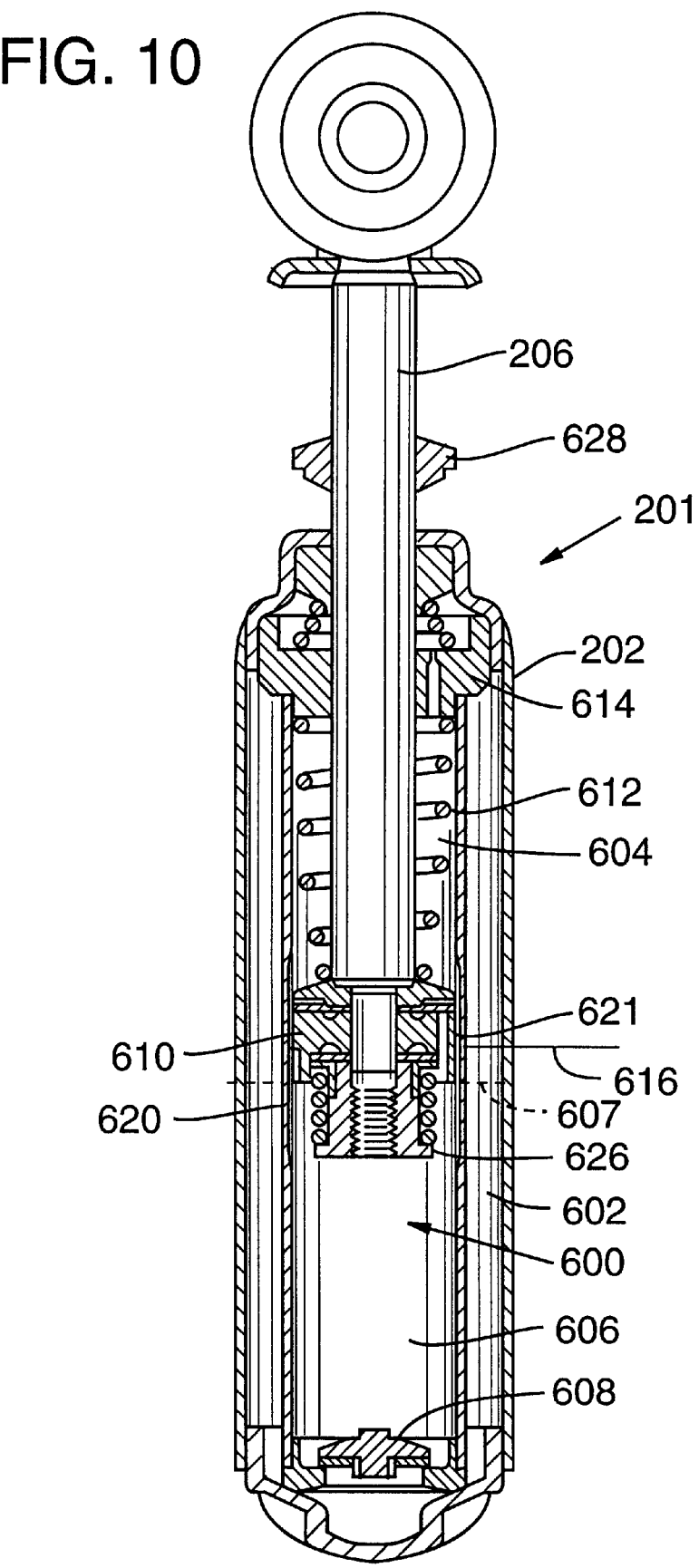
FIG. 10 is a vertical sectional view through one form of vibration dampening cylinder for the vibration dampers of FIGS. 4 and 9.
Figure 10B:
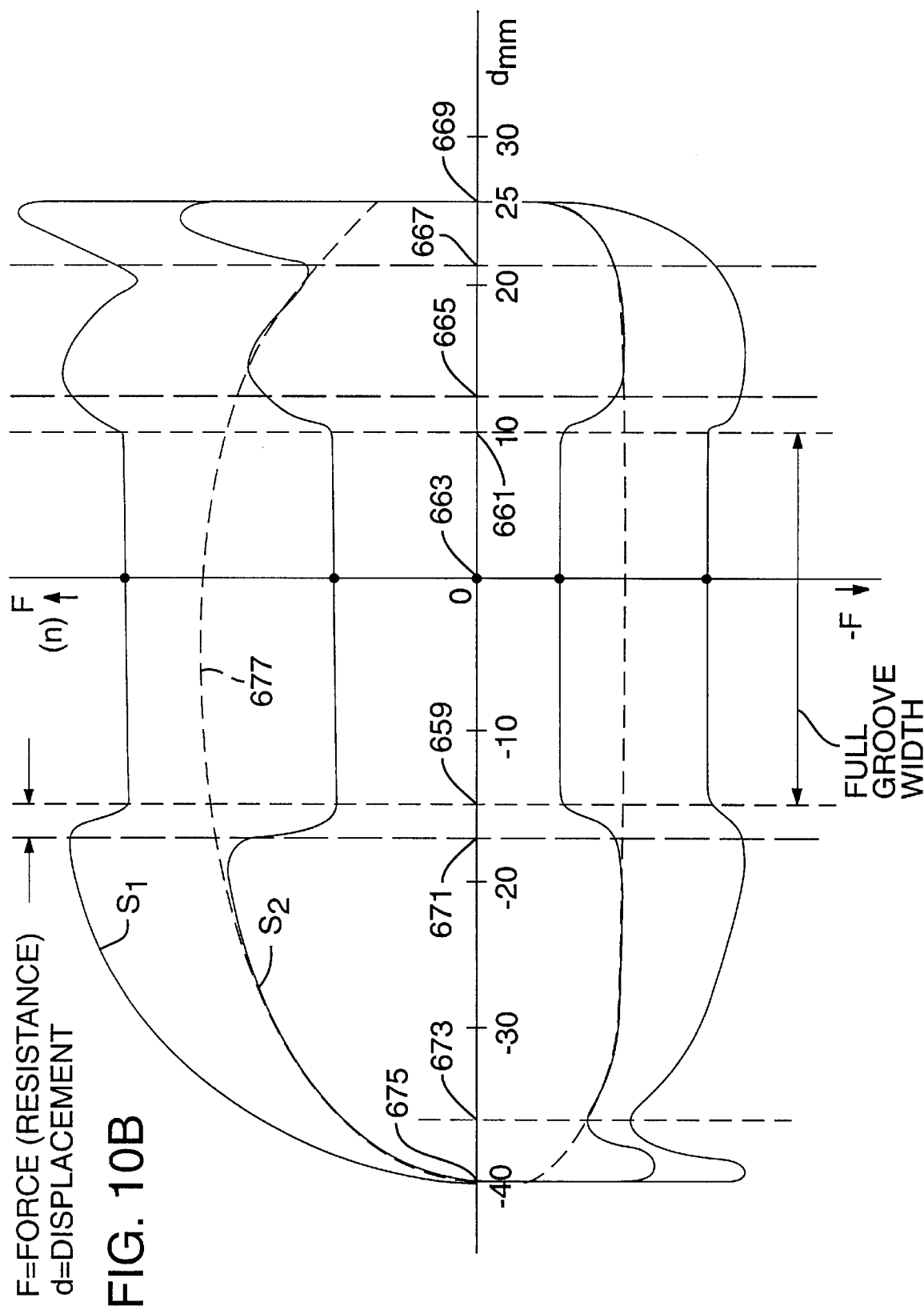
FIG. 10B is a graph illustrating an example of the dampening force versus displacement from a home position in response to shifting the piston of a shock absorbing damper of FIG. 10 at a velocity which varies sinusoidally.

An exemplary dampener of this type is illustrated in FIG. 10 and examples of its operation is indicated in FIGS. 10A and 10B. Non-linear dampeners are not known to have been heretofore used to dampen seat vibrations. However, non-linear dampening cylinders are available from companies such as Monroe Auto Equipment Company.

The specific shock absorber embodiment of FIG. 10 (with the components 360, 370 in FIG. 8 eliminated for convenience), includes interior and exterior chambers 600, 602. Chamber 600 includes fluid charged regions 604, 606 above a fluid charged area 606. Makeup fluid is stored in chamber 602 (e.g. below the dashed line 607 in this figure), with the flow of makeup fluid between the two chambers controlled by conventional valve 608. Chamber 602 includes a gas charge (e.g. above the dashed line 607 in this figure). A piston 610 is mounted to the piston rod 206 for sliding within the chamber 600. A biasing spring 612, positioned between piston 610 and an interior stop 614, urges the piston toward a home position indicated at 616 in FIG. 10. The spring 612, which may have a spring rate of about fifty Newtons per mm (although this is variable) may be a conical spring which collapses upon itself as it is compressed to reduce the amount of space required by the spring when fully compressed to thereby reduce the overall required operating length of the dampener 201. The interior wall bounding chamber 600 may be provided with one or more longitudinally extending grooves (two being indicated at 620, 621). The grooves control the rate at which fluid bypasses the piston 610 as the rod 206 is extended and retracted to thereby control the applied dampening force. The cross-sectional area of the grooves may be greater at home position 616 than at areas further removed from the home position to vary the dampening force with the distance the piston travels from the home position. For example, the grooves may be tapered to reduce their cross-section, moving further away from the home position. Alternatively, more grooves may be provided closer to the home position than further away to decrease the resistance to lesser movements of the piston and rod away from the home position. Stepwise variations in the applied dampening force may also be provided, for example by including stepped differences in the cross-sectional area of the grooves at specific locations along the length of the cylinder. Also, the dampening force may be varied non-linearly with distances from the home position. For example, for greater movements of the piston from the home position, corresponding to greater vibrations of the seat, the dampening force may be increased non-linearly to a much higher level than applied to minor deviations or movements from the home position. Also, the dampening force may be constant for certain predetermined deviations from the home position and then increase as these predetermined deviations are achieved. For example, the bypass grooves may be of a constant cross-sectional dimension over these predetermined deviations and then decrease in cross-sectional dimension after the predetermined deviations from the home position are exceeded. As the piston approaches the design limits of its maximum compression and/or extension, bumpers 626 and 628 may be engaged and compressed to cushion the latter movements of the shock absorbing damper.

In addition, in the illustrated construction, differing forces may be provided in opposition to downward movements of the seat than in opposition to upward movements of the seat. In addition, greater travel of the dampening cylinder may be allowed in response to vibrations in one direction than another. More specifically, in an illustrated approach, lower dampening resistance is provided to counteract reductions in seat height (compression of cylinder 202) than to counteract increases in seat height (extension of cylinder 202). Also, further travel is allowed by the dampening cylinder 202 in response to compression (seat height reduction) than in extension. Typically, greater energy needs to be absorbed in compression (for example, if a truck hits a bump, the deck or floor of the truck tends to move upwardly toward the seat) than in extension. By providing a lesser dampening force in response to compression and permitting greater dampening movement of the cylinder in response to compression, a smoother ride is provided.

The profile of the dampening force applied in response to travel of the piston 610 may be varied. However, in one specific example, the dampening piston 610 is permitted to travel forty millimeters in compression (including bumper compression at the end of the dampener stroke) and twenty-five millimeters in extension (including bumper compression).

FIG. 10A (not to scale) illustrates the dampening applied in response to two velocities of vibration induced seat travel. Specifically, at a relatively low velocity of 4.7 inches per second, an exemplary dampening force profile in compression and extension is shown in dashed lines in FIG. 10A. In addition, an exemplary dampening force profile at relatively high velocity of 26.7 inches per second is shown in the solid lines in FIG. 10A. As can be seen in this figure, in this example, from a distance of about 15 mm in compression from the home position to a distance of about 10 mm in extension from the home position, the cross section at each of the grooves remains constant. Consequently, over this range the applied dampening force is constant. This dampening force resists the bulk of the vibrations, as most vibrations cause a relatively small range of seat motion. From about 10 mm of extension to about 12 mm of extension, in this example the cross-sectional dimension of the grooves is reduced (in this case, the grooves are tapered such that the resistance force increases generally linearly over this range). Again, stepwise or other variations can be provided. In this example, the resistance force varied non-linearly from the home position. If the variation were linear, the slope of the dampening force versus distance of travel from the home position would be constant. At about 12 mm of extension, the cylinder wall grooves have ended. The resistance against extension continues to increase, but at a different rate. When the bumper is engaged, the resistance increases more sharply and, in theory, goes to infinity after the bumper is fully compressed at the desired maximum extension, in this case, twenty-five millimeters. Conversely, looking at the compression side of the profile, from about 15 mm of compression to about 17 mm of compression, the cross-sectional dimension of the grooves is reduced so that the resistance against compression increases. Thus, the resistance against compression has also varied non-linearly from the home position. From about 17 mm of compression through the engagement of the bumper contact, the grooves in this specific example have ended. Resistance against compression continues to increase and increases more sharply approaching bumper engagement. Following full compression of the bumper, the resistance against compression, in theory, goes toward infinity. In this specific example, forty millimeters of maximum compression is permitted. As can be seen in FIG. 10A, in general, there is a hysteresis effect to the profile as indicated by the arrows shown in this graph.

Although variable, in a specific example, at point 650, the end of the grooves with the piston extending at high velocity, a seven hundred pound dampening force is applied. In contrast, in this example, at high velocity and at the end of the grooves with the piston moving in compression, at point 652 the dampening force is sixty hundred fifty pounds. Also, at the low velocity of 4.7 inches per second, at point 654, which corresponds to the end of the grooves when the piston is extending, a two hundred pound dampening force is applied. Conversely, at point 656, corresponding to the end of the grooves with the piston moving at this low velocity in compression, a dampening force of one hundred points is applied.

FIG. 10B illustrates an exemplary response of the dampening cylinder 10 as it is extended and compressed at two sinusoidally speeds S1 and S2. The speeds S1 and S2 are at a maximum at about the center of the range of motion with speed S1 being greater than S2. Between locations 659 and 661 the bypass grooves are of a constant cross-sectional dimension and the applied resistance force is constant for a given speed S1, S2 and in a given direction (extension or compression). As can be seen in this example, in general at a given displacement from the home position 663, the magnitude of the resistance against compression (below the X axis) is lower than the magnitude of the resistance against extension (above the X axis). At location 661, and over a distance in this case of about 2 mm (from 10 mm extension to 12 mm extension) the cross-sectional dimension of the bypass grooves taper. At location 667 engagement of the bumper commences. The maximum extension is indicated at 669. In the other direction from the home position, from 15 mm to 17 mm, in this example, the bypass grooves taper (location 659 to location 671). At location 673, the cushioning bumper is engaged with maximum compression occurring at location 675. The dashed line 677 indicates the expected force/displacement curves at speed S2 if no bypass grooves are provided.

Figure 11:
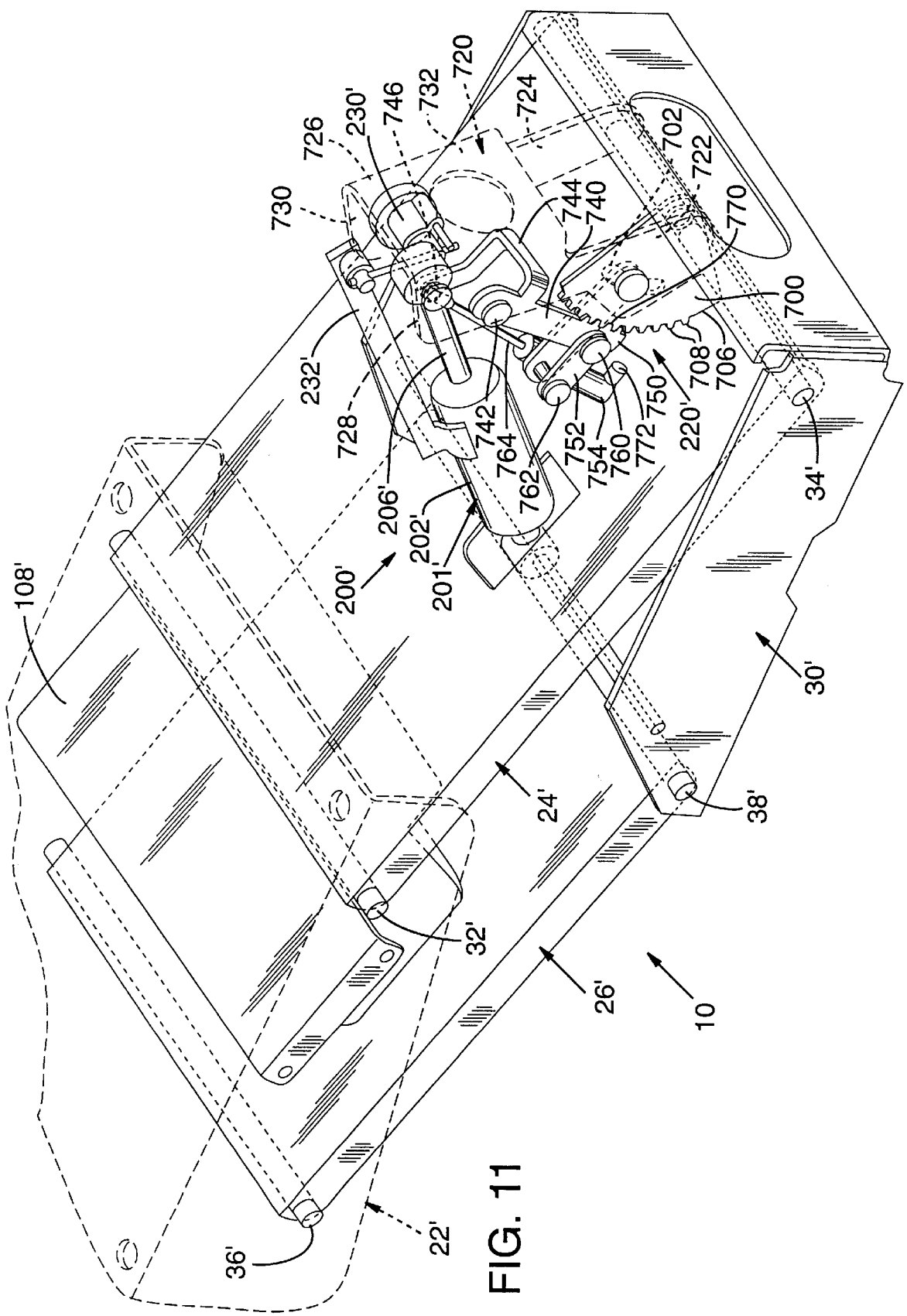
FIG. 11 is a perspective view of an alternative embodiment of a seat suspension system in accordance with the invention.
Figure 12:
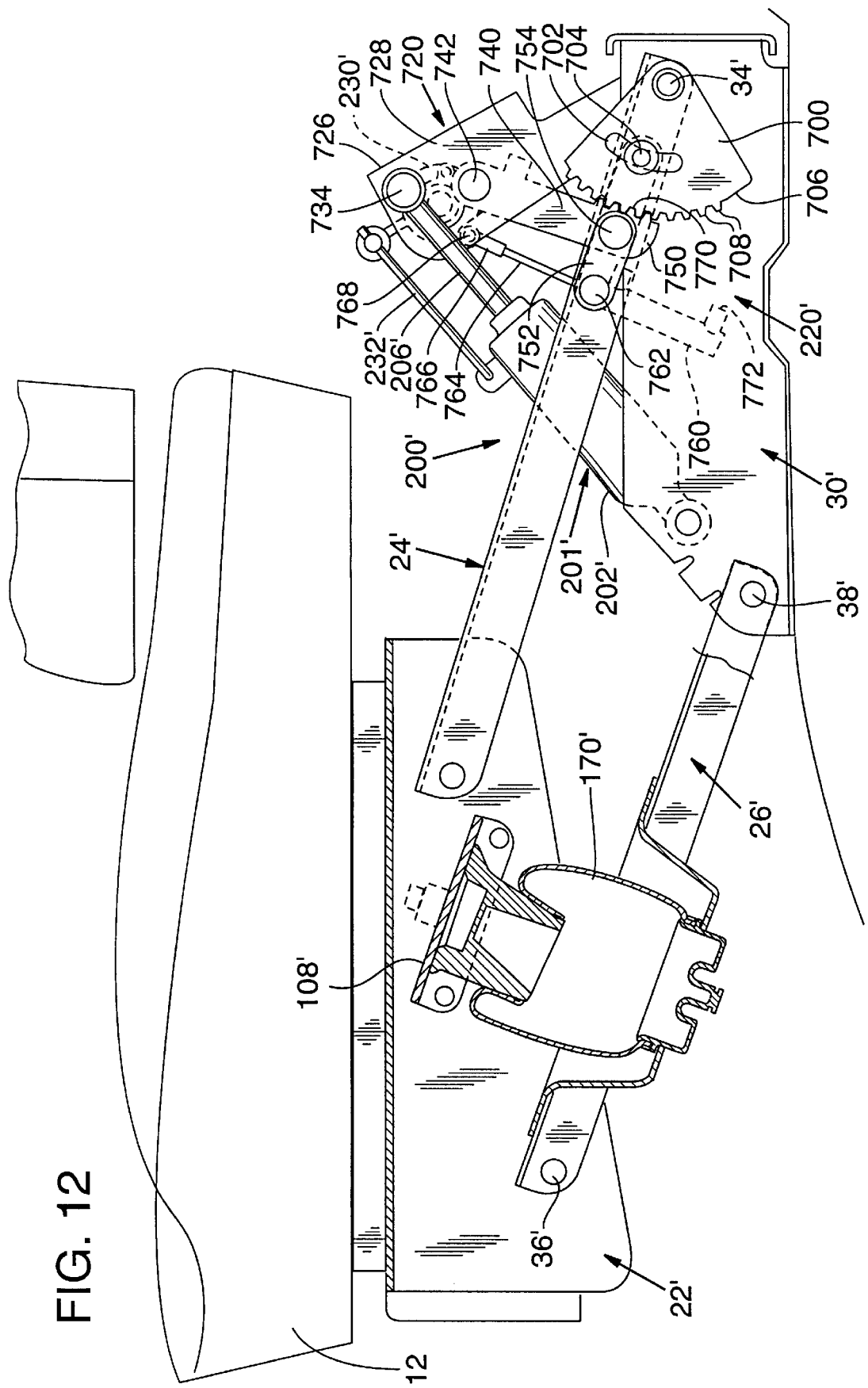
FIG. 12 is a side elevation view, partially in section, of the seat suspension system of FIG. 10, shown with a seat in a partially elevated position and also showing a latch in a latched state.
Figure 13:
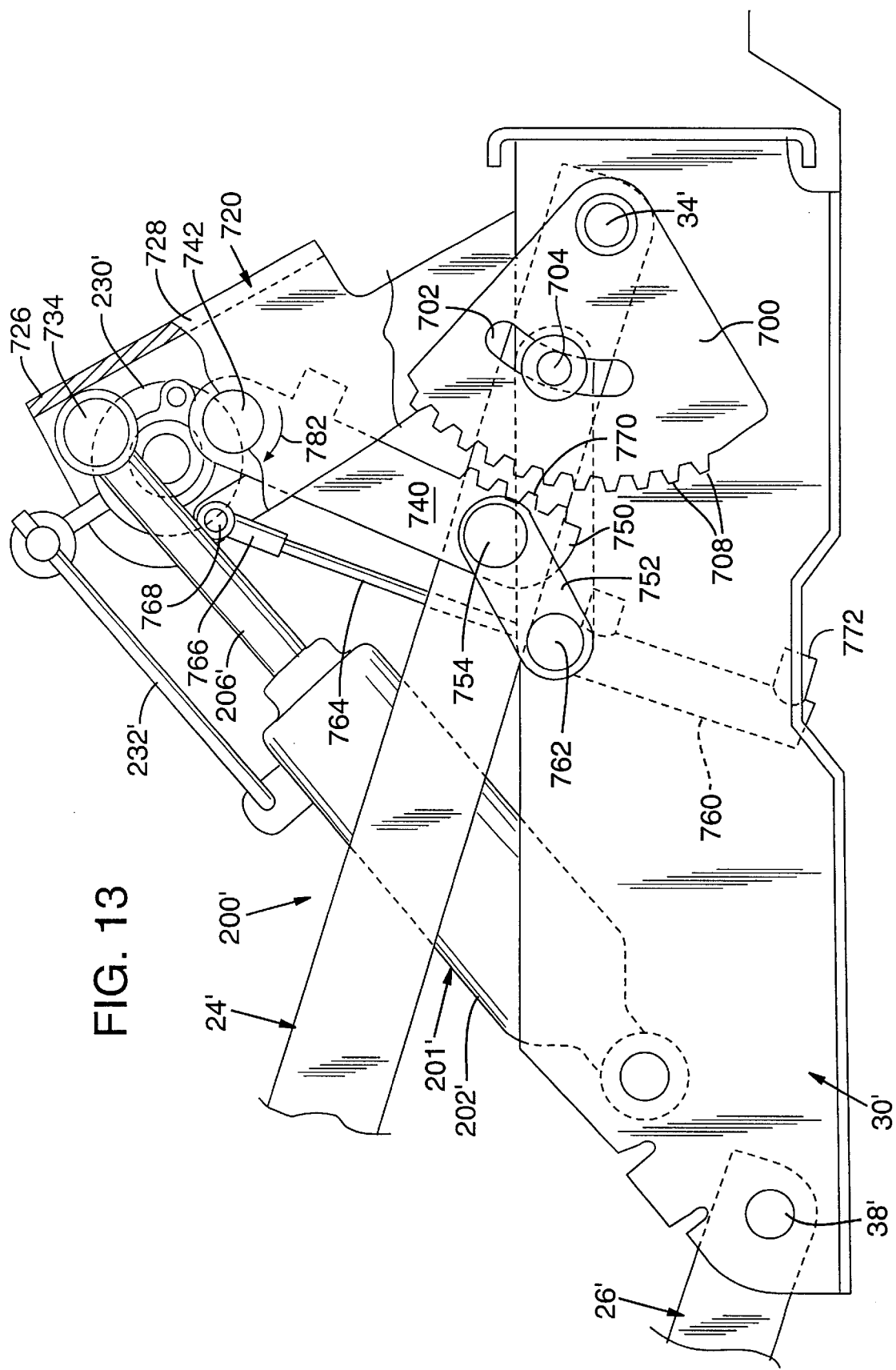
FIG. 13 illustrates a portion of the seat suspension system of FIG. 11 with the latch shown in an unlatched state.

FIGS. 11–13 illustrate an alternative form of seat suspension system with a latch external to a dampener and which is operable independently of the dampener. For convenience, components in FIG. 11 which correspond to similar components in FIGS. 1–3 have been identified with the same numbers with the superscript ('). Consequently, these corresponding components will not be discussed in detail, although they do illustrate some of the wide variations of configurations which may be used for these components.

The illustrated latch 220' includes a sector plate 700 pivotally mounted to the base 30' for pivoting about the axis 34'. The sector plate includes an arcuate slot 702. A pin 704 extends from link member 24' through the slot 704. The sector plate is thus free to pivot relative to link member 24' and about axis 34' within the limits defined by the slot 702. Sector plate 700 includes an arcuate outer edge portion 706 which comprises a latch engaging surface. The latch engaging surface may be friction enhanced and may include a plurality of teeth, some being indicated at 708 in these figures.

An upwardly extending bracket 720 having parallel spaced-apart legs 722, 724 may be included in the latch construction. The legs 722, 724 are mounted for pivoting about the axis 34'. An upper portion 726 of bracket 720 may be of an inverted, U-shaped construction, with side flanges 728 and 730 interconnected by a base or top portion 732. The upper end of rod 206' of the shock absorber 201 is pivoted to side flange 728 of the bracket 720 so as to be pivotal about an axis 734. The leveling valve 230' is supported by side flange 730. A latch arm 740 is pivoted at 742 to the bracket side flange 728. In addition, a latch arm extension 744 extends from an upper end portion of latch 740 and has an uppermost portion 746 which is pivoted for movement about the axis 734. A lower portion of latch arm 740 is pivotally coupled to a link 752 for pivoting about an axis 754. Link 752 supports a latch actuator, such as a pneumatic actuator 760. In this case, the pneumatic actuator 760 is pivoted to link 752 for pivoting about an axis 762. The illustrated actuator 760 may be the same as actuator 390 (FIG. 1) and, in this case, includes a piston coupled to a rod 764. The rod 764 has its upper end portion 766 pivoted to side flange 722 for pivoting about a pivot axis 768. The latch arm 740 includes a latch surface for engaging the latch gripping surface of the sector plate 700. One form of latch gripping surface is indicated at 770 and comprises a plurality of teeth sized and positioned to engage the teeth 708 of the sector plate when the latch is in a latched condition, as shown in FIGS. 11 and 12.

To unlatch the latch, actuator 760 is activated to, in this case, extend the rod 764, as shown in FIG. 13. With the above-described linkage arrangement, when rod 764 extends, for example in respond to delivery of pressurized fluid to port 772 of the actuator 760, the latch arm 740 pivots in the direction of arrow 782 in FIG. 13 10 (clockwise in this figure). This shifts the lower end portion 750 and the gripping surface 770 of latch arm 740 away from the teeth 708 of the sector plate 700. When unlatched as shown in FIG. 13, links 24' and 26' may be moved by the air spring 270' to adjust the seat elevation without changing the position of the shock absorbing damper 201'. That is, link 24' may be moved relative to the sector plate 700. After the seat has been adjusted to the desired elevation, piston rod 764 may be retracted to pivot arm 740 in a direction opposite to arrow 782 and into engagement with the teeth on the sector plate as shown on FIG. 12.

The latch 220' may be controlled in the same manner as the latch 220 of FIGS. 1–3. For example, the latch may be shifted to its unlatched position during the entire time the set height is being adjusted by air spring 270' and then latched following seat height adjustment so that the same dampening force is applied immediately after seat height adjustment as was applied immediately before seat height adjustment. Alternative latch control approaches may also be used, as previously described.

In the construction of FIGS. 11–13, the leveling valve 230' may operate in the same manner as leveling valve 230. That is, with the latch in a latched condition and in the event the load on the seat is varied (for example, the occupant of the seat gets off the seat), the seat will tend to raise. When the seat raises beyond the upper limit established by leveling valve 230, the leveling valve controls the exhaustion of gas from the air spring 270' to readjust the position of the seat. In the illustrated construction, the seat position is readjusted toward its original home position. Conversely, when a load is reapplied to the seat and the seat lowers in elevation beyond a lower limit established by leveling valve 230', the leveling valve 230' operates to cause the delivery of additional air to air spring 270' to again raise the seat toward the home position. When the latch is unlatched, the seat elevation may be freely adjusted as the leveling valve 230' is decoupled and thus inoperative when the latch is unlatched during intentional seat height adjustment by the air spring 270'.

Figure 14:
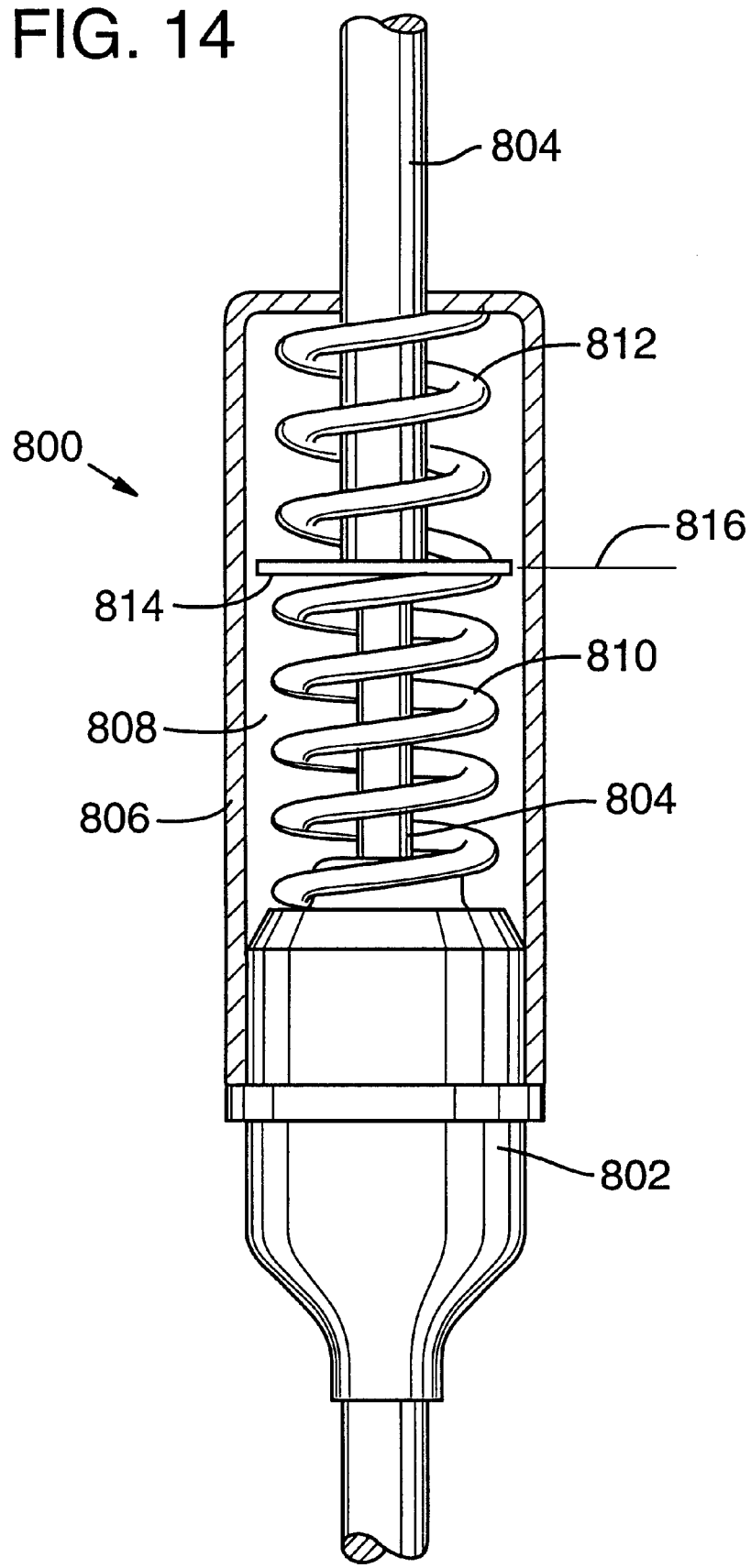
FIG. 14 illustrates an alternative form of vibration dampening cylinder for the seat suspension systems of FIGS. 1 and 11.

FIG. 14 illustrates an alternative form of shock absorber 800 which may be utilized in the disclosed embodiments of the seat suspension system. The illustrated FIG. 14 shock absorber includes a lower shock absorbing section 802 within which an internal piston may be provided and coupled to a piston rod 804. A housing 806 defines a biasing spring receiving chamber 808 within which first and second biasing springs 810, 812 are provided. An internal spring separation plate 814 is mounted to the rod 804. With this construction, spring 810 resists compression of the dampener and corresponding movement of the rod 804. In contrast, the spring 812 resists extension of the rod 804. The biasing forces exerted by the springs may be different and the distance of travel in compression and extension may be varied. As one specific example, spring 812 may provide twenty pounds force per inch resistance with a maximum extension of twenty-five millimeters, while spring 810 may provide forty pounds force per inch compression with a maximum compression distance of forty millimeters, the distances being from a home position indicated at 816 in FIG. 14. At the home position in the illustrated form of shock absorber, the springs exert fifteen pounds force against one another.

Again, other vibration dampeners, including other forms of shock absorbers, may be utilized in the illustrated seat suspension systems.

FIGS. 15, 16, 16A and 17 illustrate another form of latch mechanism which may be used in the illustrated seat suspension embodiments. Again, for purposes of convenience, components of the seat suspension of FIG. 15 and the related figures which correspond to components of FIG. 1 are illustrated with the same number as utilized in FIGS. 1–3, except with a double prime superscript ("). These corresponding components will not be described in any detail.

The vibration dampener 220" comprises a rod gripping latching assembly 870 coupled at its upper end portion 872 to the seat support member 22" at a location rearwardly of pivot 32". The lower end portion of the vibration dampener 220" is pivoted to base 30" at a location forwardly of pivot 38". More specifically, the illustrated rod gripping latch assembly 870 is pivoted to downwardly projecting ears, one being shown at 874 in FIG. 15, at the underside of seat supporting member 22" for pivoting about a pivot axis 876. The piston rod 206" in this embodiment is of an extended length and passes through the rod gripping latch assembly 870. When in a latched condition, the rod is gripped by the latch assembly 870 so that it does not move relative to seat support member 22". Consequently, the dampener 200" is operable to dampen seat vibrations. When unlatched, the rod 206" is free to slide relative to the rod gripping latch assembly 870. Thus, for example, the rod may be released during seat height adjustment by air spring 270" so that the elevation of the seat may be adjusted to a new desired elevation. The latch may then be operated to re-engage the rod 206" and again apply the dampening force to the seat support and the seat. Consequently, the dampening force applied to the seat may be the same immediately before and after a seat elevation adjustment by air spring 270". The latching mechanism 220" may be controlled in various manners, such as previously described in connection with the latching mechanism 220.

An optional positioning sensor, such as leveling valve 230", may be included in this system, as well. Leveling valve 230" is coupled by links, including link 232", to a collar 878 which is secured to rod 206" for movement with the rod. Leveling valve 230" may be operated in the same manner as leveling valve 230 and, hence, its operation will not be described in detail.

Figure 15:
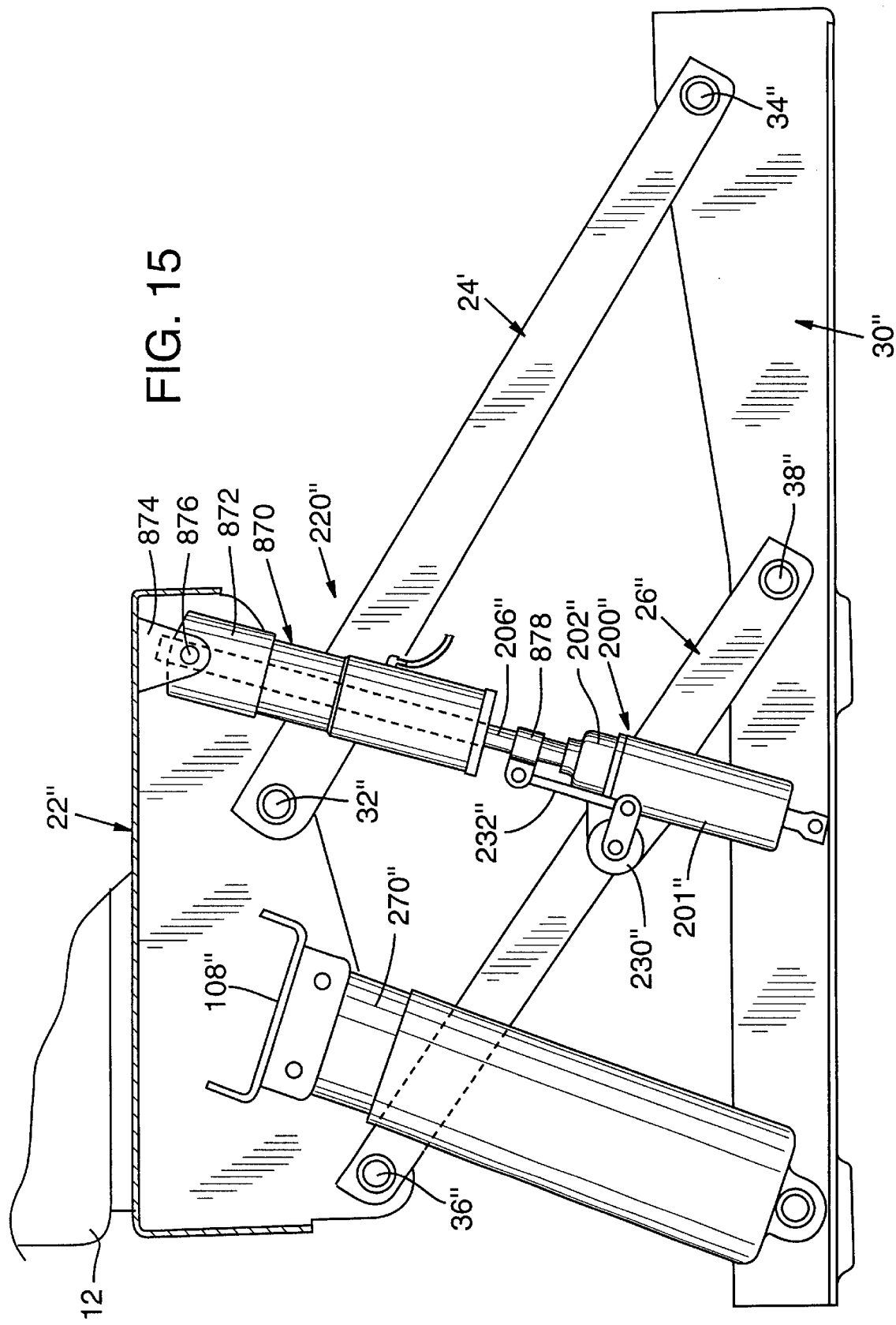
FIG. 15 is a side elevation view of a seat suspension system including an alternative form of latch.

It should be noted that the construction of FIG. 15 is less compact than the construction of FIG. 1 due to the elongated nature of piston rod 206". To reduce the overall length of the construction, latch mechanism 870 may be positioned adjacent to shock absorber 200" on a separate rod or other element which is to be gripped. In this latter case, the shock absorber 201" may be coupled to this alternative rod or element which is to be gripped.

With reference to FIGS. 16, 16A and 17, the illustrated FIG. 15 form of rod gripping latch assembly will next be described. More specifically, the illustrated latching assembly 870 includes an outer cylindrical housing 890 defining an upper chamber 892 and an enlarged lower chamber 894. Upper and lower end caps 896, 898 are threaded or otherwise secured to housing 890 to enclose the respective ends of the latch mechanism 870. A piston 900 is positioned within housing 890 and has an upper portion 902 and a lower enlarged portion 904. Upper portion 902 supports an O-ring seal 906 which engages the interior wall of housing 890 in the region of upper chamber 892. Lower enlarged portion 904 of piston 900 carries an O-ring 908 which sealingly engages the interior wall of housing 890 in the region of the lower chamber 894. A biasing spring 910 is positioned between end cap 898 and piston 900.

The assembly also includes at least one rod gripping element and, in the illustrated form, includes four such elements 912, 913, 914 and 915. Each of the illustrated elements 912 through 915 is spring biased away from the rod 206". For example, the rod gripping elements may be supported by a spring 916 having an enlarged upper end portion 918 secured between the cap 896 and housing 890. The lower exterior surface of the rod gripping elements, such as indicated at 918 for element 912, may taper downwardly into a wedge-shaped configuration. With piston 900 in the position shown in FIG. 16, an upper surface of piston 902 bears against the wedge surfaces 918 to urge the rod gripping elements 912–915 against the rod. The rod 206" may include a friction enhanced outer surface to facilitate gripping of the rod by the rod gripping elements. In addition, the surface of gripping elements 912, 915 which engages the rod may also be friction enhanced. As a specific example, a plurality of concentric ridges, such as indicated at 920, may be provided along the length of rod 206". These ridges, although not apparent from the figures, may extend along a region of rod 206" of a length corresponding to the full range of seat height adjustment so that, regardless of the height to which the seat has been adjusted, ridges 920 are in position for gripping by the elements 912–915 at all seat height adjustments. Corresponding grooves may be provided as indicated at 922 in the rod gripping surface of the elements 912–915. In effect, teeth are thus provided on the surfaces 920 and 922 which mesh together to lock the rod 206" to the latching assembly 870 when piston 900 is positioned as shown in FIG. 16.

With reference to FIG. 17, to disengage the latch assembly 870 from the rod 206", pressurized fluid such as air is delivered via line 924 to that portion of chamber 894 between the seals 906 and 908. This shifts piston 900 downwardly as shown in FIG. 17. Due to the spring bias on rod engaging elements 912–915, these elements shift outwardly away from the rod (see arrows 925) so as to disengage the surfaces 920, 922 from one another. This permits sliding movement of the latch assembly 870 in either direction along the rod as indicated by double headed arrow 926 during seat height adjustment. Following seat height adjustment, pressure may be relieved on line 924, permitting spring 910 to shift piston 900 upwardly to cause elements 912–915 to re-engage the rod 206".

Thus, the latching mechanism 870 also allows the use of a dampener capable of applying a non-linear dampening force to the seat. During seat height adjustment in this example, however, the home position of the dampener remains at the same elevation. That is, in this case, the seat can be moved relative to the dampener rather than moving the dampener with the motion of the seat. Again, latching mechanism 870 may be controlled in the same manner as previously described for latching assembly 220.

Figure 17A:
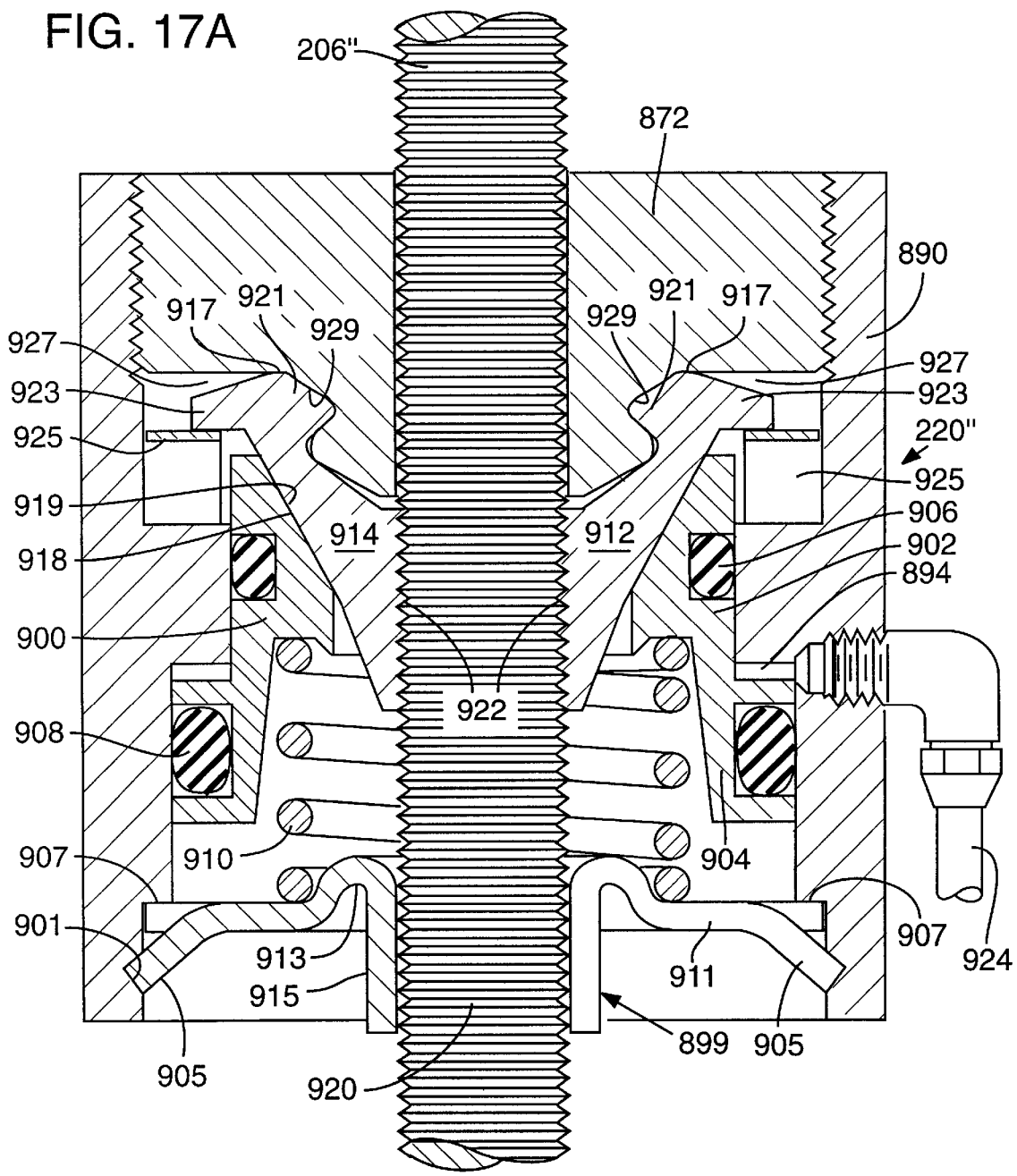
FIG. 17A is a vertical sectional view through an alternative latch similar to that shown in FIGS. 16, 16A and 17.

FIG. 17A illustrates another form of latch mechanism which is similar to that shown in FIGS. 15, 16, 16A and 17 and which may be used in the illustrated seat suspension embodiments. For purposes of convenience, components of the seat suspension latch of FIG. 17A which correspond to components of the embodiment of FIGS. 15, 16, 16A and 17 are illustrated with the same numbers. These corresponding components will not be described in any detail. The latch shown in FIG. 17A is longitudinally more compact than the latch shown in FIGS. 16 and 17 and thus may be included, for example, in applications where space limitations are greater.

With reference to FIG. 17A, although a cap such as 898 in FIG. 16 may be used, a mechanically simple spring retainer 899 is shown for retaining the biasing spring 910 in position. An annular notch 901 is provided around the interior perimeter of housing 890 and adjacent to the lower end of this housing. The spring retainer includes fingers 905 which fit within notch 901 when the spring retainer 899 is installed. These fingers are deflected during installation of the retainer 899 and then snap into the notch 901 when in position. An annular shelf 907 is provided near the lower end of housing 890 and above the notch 901. A horizontal radially extending disk-like body portion 911 is included in the illustrated retainer 899. The upper surface of the distal end of the body portion 911 engages the shelf 907. Fingers 905 project from the body portion. A central portion 913 of body portion 911 is raised as shown to define a seat which is inserted into the interior of the spring 910. A downwardly extending collar portion 915 of body 911 surrounds the shaft 206". The retainer 899 may be stamped or otherwise formed from a single piece of sheet metal or other suitable material.

The locking elements 912, 914 (again, one or more such locking elements may be provided, with four such elements being included in the illustrated embodiment), each include a friction enhanced surface, in this illustrated case a toothed shaft gripping surface 922. The surface 922 selectively engages a friction enhanced surface on shaft 206", in this case toothed surface 920, when the shaft is engaged by the latch.

The gripping elements 912, 914 are shaped and biased toward an unlatched state or condition in which surfaces 922 and 920 are disengaged from one another. When spring 910 urges piston 900 upwardly as shown in FIG. 17A, surfaces 918, 919 engage one another. As a result, the surfaces 922 and 920 are shifted into cooperative latching engagement. Conversely, as explained previously in connection with FIGS. 16 and 17, when pressurized air is delivered via air supply line 924 to chamber 894, the piston 900 shifts downwardly from the position shown in FIG. 17A. As a result, the surfaces 920, 922 disengage one another. When disengaged, because of the biasing on latching elements 912, 914 (and elements 913 and 915, not shown in FIG. 17A), the latch gripping elements are released from the shaft.

In the specific example shown, this biasing of elements 912, 914 is accomplished by an annular wave spring 925 which engages an undersurface of a radially outwardly projecting flange 923 of each of these latch gripping elements. A gap 927 is provided between the upper surface of flange 923 and the under surface of cap element 872. Consequently, when piston 900 moves downwardly in FIG. 17A, wave spring 925 pivots the latch elements 912, 914 about a rocking or pivot point 917 with flange 923 moving toward the cap 872. This in turn shifts the latch surfaces 922 away from the rod 206", releasing the rod from the latch gripping elements. An inwardly projecting rib portion 921 of the latch elements 912, 914 is positioned within a radially inwardly extending annular notch 929 formed in cap piece 872. Consequently, the latch elements 912, 914 do not shift longitudinally within the housing 890 when piston 900 is moved.

Again, the construction of FIG. 17A illustrates one variation of the latch of FIGS. 16 and 17 which is longitudinally more compact. Also, the latch of FIG. 17A may be used in the orientation shown in FIG. 17A or in any other orientation, such as in the opposite (e.g. rotated 180 degrees) position from the position shown in this figure.

FIG. 18 illustrates yet another embodiment of a seat suspension system having features in common with the previously described systems. Elements in common with those previously described have been given the same numbers, with a triple prime ('") superscript and for this reason will not be described in detail. In the embodiment of FIG. 18, the seat support member 22'" is raised and lowered by air spring 270'" by respectively inflating and deflating the air spring. Vertical motion of the seat member 22'" is guided by a rod 930 extending upwardly from the floor 14'" of the vehicle. A slide 932 is slidably mounted to the rod 930. A latch 934 selectively couples the slide 932 to the rod. During seat height adjustment, the latch 934 may be operated in the same manner as previously described for latch mechanism 220. Thus, for example, the latch 234 may be unlatched to permit sliding of slide 232 upwardly and downwardly along rod 930 as the air spring 270''' raises or lowers the seat. In addition, as an example of this operation, after the seat height has been adjusted, the latch 934 may be actuated to latch the slide 932 to the rod. A biasing spring 936 urges the slide 932 to a central or home position. Enlarged collars 938, 940 are provided at the respective upper and lower ends of the slide 932. Collar 938 engages the bottom surface 942 of seat support member 22''' to limit the upward motion of the seat in response to vibrations. Conversely, downward motion is limited by the extent to which collar 940 may travel in a downward direction before spring 936 is fully compressed. The slide 932 has a central portion which passes through an opening 948 through seat support member 22'''. The opening 948 is sized to prevent passage of the collars and spring 936 through the seat support member. A damper 200''', which may be a simply shock absorber, engages the upper surface 946 of seat support member 22''' and is coupled by links 950, 952, 954 and 956 to the slide 936 and the seat support member 22'''. When the seat vibrates, link 952 pivots about pivot a 958, with this motion being dampened by shock absorber damper 200'''. Link 954 supports pivot 952 to permit this motion.

A seat position sensor, such as leveling valve 230''', may be used to adjust the inflation of the air spring and the seat elevation upon changes in loading on the seat when the slide is latched to the rod 930. Leveling valve 230''' is coupled by a link 232''' to the collar 938 for this purpose.

FIGS. 19–22 disclose one form of a suitable pneumatic circuit and valve for the illustrated seat suspension embodiments. It should be understood that the valve arrangement and pneumatic circuits may be varied. However, the circuitry described below utilizes a valve (or two separate valves) actuated by a single lever or single switch for simultaneously controlling both seat elevation adjustment and the latching and unlatching of a latch mechanism. Although this construction is advantageous, separately actuated valves may also be used for accomplishing these results.

Figure 19:
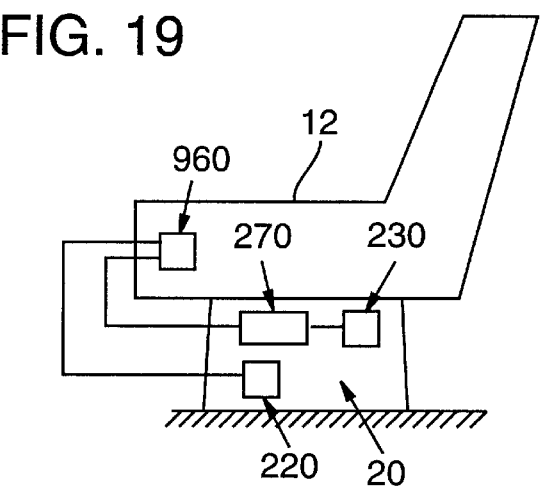
FIG. 19 schematically illustrates one form of control circuit for the illustrated seat suspension embodiments.

FIG. 19 illustrates the seat 12 shown schematically on a seat support 20. The seat may be raised and lowered as previously described, such as by the air spring 270. In addition, the system may include a latch, such as latch 220. Air spring 270 and latch 220 are shown schematically in FIG. 19. In addition, the optional automatic leveling valve 230 is also shown in this figure coupled to the air spring 270. In addition, a valve 960 is shown for controlling both the air spring 270 during seat height adjustment and the latch 220.

Figure 20:
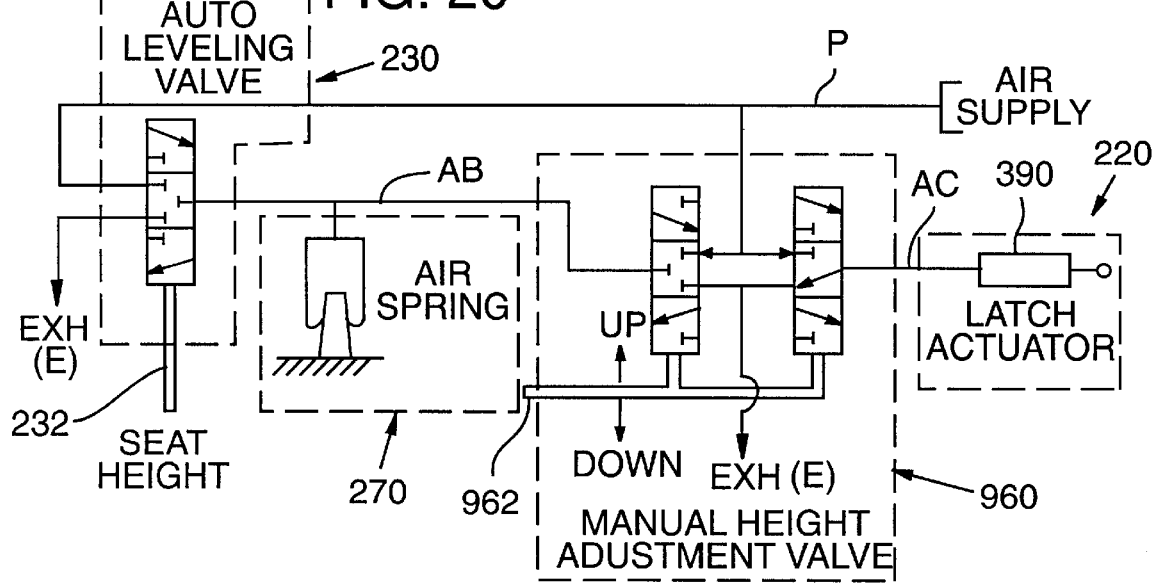
FIG. 20 illustrates an exemplary pneumatic circuit usable in the illustrated forms of seat suspension systems.

With reference to FIG. 20, pressurized air is supplied along a line P to both the valve 960 and the leveling valve 230. Exhaust lines E are also shown coupled to these valves. In the configuration shown in FIG. 20, no automatic leveling is occurring, the latch actuator 390 is in position to latch the latch mechanism 220, and the seat height is not being adjusted. Thus, the air spring line AB is neither being supplied with pressurized air nor being exhausted through either of the valves 960 or 230. In this situation, assume the seat height changes while latch 220 is latched. In such a case, the link 232 shifts valve 230 either upwardly or downwardly. If the seat has raised sufficiently to operate the valve 230, the valve 230 shifts upwardly in FIG. 20, coupling air spring line AB through valve 230 to exhaust line E, resulting in deflation of the air bag until such time in this example as the seat has been lowered to the point where the auto leveling valve no longer operates. Conversely, in this situation, if a load is added to the seat, causing the seat to depress or lower, link 232 causes valve 230 to shift downwardly in FIG. 20. If the seat lowers sufficiently to operate the valve 230, pressure supply line P is coupled through valve 230 to the air spring line AB so as to inflate the air spring. The air spring will continue to inflate in this example until auto leveling valve 230 is no longer actuated. As previously described, for example in connection with FIG. 1, if the dampening valve is unlatched and the seat height is adjusted, link 232 does not operate the auto leveling valve 230.

Next, assume the seat occupant desires to raise the elevation of the seat. In this case, a manual actuation lever 962 is shifted upwardly in FIG. 20. This couples the pressure supply line P through valve 960 to the air spring line AB, causing the air spring to inflate and raise the seat. The valve 960 may be biased to the neutral position shown in FIG. 20 so that, upon releasing of the lever 962, the valve returns to the position shown in FIG. 20 and further inflation of the air spring stops. In addition, in the circuit illustrated in FIG. 20, as the valve 960 shifts upwardly in this figure, the line P is also coupled through the valve to the latch actuator line AC. Consequently, pressurized fluid is delivered to the latch actuator 390, causing the latch actuator to release the latch. This relieves the dampening force from being applied to the seat. After the seat reaches its desired elevation and valve 960 returns to the position shown in FIG. 20, line AC is again exhausted, causing latch actuator 390 to control the latch 220 to latch the dampener mechanism into its operative dampening force applying state.

If it is desired to lower the seat, lever 962 is moved downwardly. In this case, line AB is coupled through valve 960 to the exhaust line E, causing the deflation of the air bag. Simultaneously, pressurized air is delivered from line P to line AC, causing the latch actuator 390 to release the latch 220 as described above for the case when the seat was being raised.

Figure 21A:
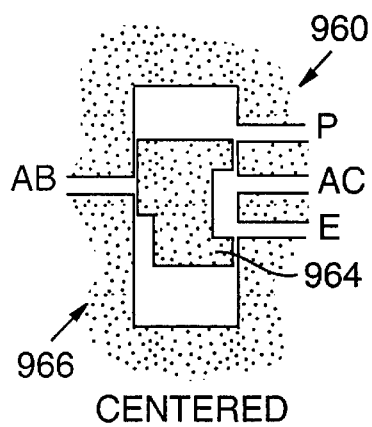
FIGS. 21A–21C schematically illustrates a valve which may be utilized to control both seat elevation adjustment and the operation of a latch.
Figure 21B:
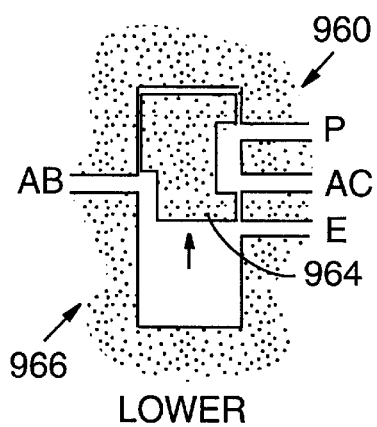
Figure 21C:
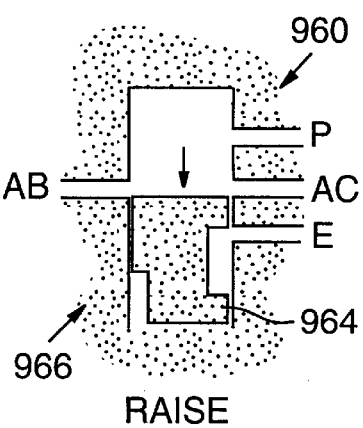

FIGS. 21A–21C illustrate one form of valve 960 having a common housing 966 within which a slide plate 964 is positioned for accomplishing the dual functions of controlling the latch and seat height adjustment as described above in connection with FIG. 20. In contrast, in FIG. 20 valve 960 had two valves, one for the seat height adjustment control and one for latch/unlatch control, which were controlled by a common actuator (e.g. lever 962). As yet another alternative, each of these two valves may have separate actuators which may be mechanically or electronically linked for simultaneous operation. FIG. 21A corresponds to the condition of valve 960 depicted in FIG. 20, with the latch actuator 390 latched (line AC being exhausted) and the seat in a constant position (line AB being neither supplied with pressurized air or being exhausted through the valve 960).

FIG. 21B illustrates the slide plate 964 shifted to a position whereby valve 960 controls the lowering of the seat and the unlatching of the latch 220. That is, air spring supply line AB is shown exhausted, resulting in a deflation of the air bag. Simultaneously, the pressure line is coupled to line AC to cause the latch actuator to unlatch the latch.

In FIG. 21C, the valve slide plate 964 is shown in a position for raising the seat. In this case, pressure line P is coupled to line AB to inflate the air spring. Simultaneously, pressure line P is coupled to line AC to cause the latch actuator to unlatch the latch 220. In FIGS. 21A, 21B and 21C, the slide plate 964 is shown in a common housing 966. As previously described, additional control approaches may also be used in operating the latching mechanism 220 and seat height adjuster. Thus, although the above approach is advantageous, other approaches may be used by which these devices operate in other sequences (for example, the latch actuator being operated during only a portion of a time the seat height adjuster is operated, or in a sequential manner).

FIGS. 22A–22E illustrate a specific form of dual function valve 960. Valve 960 includes a cover 970 overlaying housing 966. The cover has a slot 972 through which the lever 962 projects. The lever 362 may be raised and lowered as indicated by the arrows in FIG. 22A from the centered position shown in this figure. FIG. 22B illustrates the connection of lever 962 to the slide plate 964 and shows the lever and slide plate comprised of a one-piece homogeneous unitary construction. These elements may, for example, be injected molded of plastic. A wave spring 974 biases the slide plate against O-ring seals surrounding ports through housing 966. These ports are connected to the respective lines P, AB, AC and E. One of these O-rings is indicated at 975 in FIGS. 22A and 22B. A coil spring 976 is coupled to lever 962 and engages flanges projecting inwardly from cover 970 (one such flange being indicated at 978 in FIG. 22B). Spring 976 biases the lever 962 to its centered position. Suitable flow paths are defined in slide plate 964 and correspond to the centered position (FIGS. 21A and 22C); the lower seat position (corresponding to FIGS. 21B and 22D); and the raised seat position (corresponding to FIGS. 21C and 22E). Again, other valve arrangements and controls may be used, for example, electronic controls. However, the specifically illustrated approach employs a single switch lever 962 for simultaneously controlling the raising or lowering of the seat by the seat height adjuster and also latching and relatching of a latch mechanism utilized in a number of the disclosed embodiments.

Having illustrated and described the principles of our invention with reference to several embodiments, it should be apparent to those of ordinary skill in the art that these embodiments may be modified in arrangement and detail without departing from these principles. We claim all such modifications as fall within the scope of the following claims.

What is claimed is:

1. A vibration damper for a seat suspension system of the type which supports a seat above the floor of a vehicle, the seat being raisable and lowerable to support the seat at various selected elevations relative to the floor of the vehicle, and wherein movement of the seat from a selected elevation in response to vibrations is permitted, the vibration damper comprising:

a first member adapted for coupling to one of the vehicle and seat;

a shock absorber adapted to be coupled to the other of the vehicle and seat; and a latch adapted to selectively couple the first member to the shock absorber such that when the shock absorber and first member are coupled together the shock absorber applies a dampening force to the seat at least partially in opposition to elevation changes of the seat from a selected elevation in response to vibrations, and such that when the shock absorber and first member are decoupled from one another the shock absorber is relieved from applying the dampening force to the seat.

2. A vibration damper according to claim 1 in which the first member comprises a housing having an interior and an exterior, the shock absorber being substantially positioned within the interior of the housing, and wherein the latch is carried by the housing and selectively couples and decouples the shock absorber to and from the housing to thereby selectively apply and relieve the application of the dampening force to the seat.

3. A vibration damper for a seat suspension system of a type which supports a seat above the floor of a vehicle, the seat being raisable and lowerable to support the seat at various selected elevations relative to the floor of the vehicle, and wherein movement of the seat from a selected elevation in response to vibration is permitted;

a first member adapted for coupling to one of the vehicle and seat;

a shock absorber adapted to be coupled to the other of the vehicle and seat; and a latch adapted to selectively couple the first member to the shock absorber such that when the shock absorber and first member are coupled together the shock absorber applies a dampening force to the seat and when the shock absorber and first member are decoupled from one another the shock absorber is relieved from applying a dampening force to the seat;

wherein the shock absorber comprises a cylinder and a latch gripping surface carried by the cylinder;

the shock absorber also comprising a dampening piston within the cylinder and a piston rod coupled to the piston and having an end portion projecting outwardly from the piston and which is adapted to be coupled to the other of the vehicle and seat;

the latch comprising at least one latch arm including a latch surface, the latch arm being coupled to the first member with the latch arm being movable between first and second positions; and wherein when the latch arm is in the first position the latch surface and latch gripping surface engage one another to thereby couple the shock absorber to the first member and wherein when the latch arm is in the second position the latch surface is disengaged from the latch gripping surface.

4. A vibration damper according to claim 3 in which the latch gripping surface and latch surface each comprise at least one row of teeth.

5. A vibration damper according to claim 3 wherein the latch arm is pivoted to the first member for pivoting movement between the first and second positions.

6. A vibration damper according to claim 5 including a fluid actuator carried by the first member and coupled to the latch arm for shifting the latch arm between the first and second positions.

7. A vibration damper according to claim 5 in which the first member is pivotally coupled to said one of the vehicle and seat for pivoting about a first pivot axis and wherein the latch arm is pivoted to the first member for also pivoting about the first pivot axis.

8. A vibration damper according to claim 5 wherein the cylinder is also slidably coupled to the first member for sliding movement relative to the first member.

9. A vibration damper according to claim 8 wherein the first member comprises a housing having a first side wall with an exterior surface at the exterior of the housing and an interior surface at the interior of the housing, the first side wall including first and second side wall portions spaced apart from one another to define a guide slot therebetween, a slide element mounted to the cylinder and slidably coupled to the first and second side wall portions such that the slide element slides along the guide slot and guides the sliding motion of the cylinder relative to the housing.

10. A vibration damper according to claim 9 in which the cylinder is substantially disposed within the housing, wherein the slide element includes first and second interconnected slide members which sandwich the respective first and second side wall portions therebetween, the first slide member being positioned substantially within the housing, the first slide member including respective first and second teeth containing flange portions extending in a direction away from the first side wall of the housing, the first and second teeth containing flange portions being spaced apart from one another and positioned at opposite sides of the center of the cylinder from one another, the latch arm having a generally U-shaped cross section with a base and first and second leg portions, the first and second leg portions each terminating in an elongated row of teeth, the first and second leg portions each being aligned with a respective adjacent one of the first and second teeth supporting flange portions of the first slide member, and wherein the teeth of the first and second leg portions engage the teeth of the respective adjacent flange portions when the latch arm is in the first position.

11. A vibration damper according to claim 10 in which the housing includes a second wall opposite to the first wall, the second wall including an arm flange receiving opening therein, the latch arm including an arm flange projecting from the base toward the arm flange receiving opening, an actuator guide flange projecting outwardly from the second wall of the housing, the guide flange defining an actuator guide slot, a fluid actuator having an actuator cylinder which is pivoted to the housing, an actuator piston within the actuator cylinder and an actuator piston rod having an end portion projecting outwardly from the actuator cylinder, a link pivotally coupling the end portion of the actuator piston rod to the latch arm flange, the end portion of the actuator piston rod also being coupled to the actuator guide flange such that the actuator guide slot guides the movement of the actuator piston rod during extension and retraction of the actuator piston rod, wherein extension of the actuator piston rod shifts the latch arm to the second position, and retraction of the actuator piston rod shifts the latch arm to the second position.

12. A vibration damper according to claim 11 wherein the shock absorber is adapted to provide a non-linear dampening force to the seat to dampen seat vibrations, the dampening force being constant for a first range of movement of the seat in response to vibrations from a home position of the dampening piston and increasing for certain movements of the dampening piston in excess of the first range of movement.

13. A vibration damper according to claim 5 in which the first member comprises a housing, the cylinder being substantially disposed within the housing, wherein the at least one latch arm comprises first and second latch arms pivoted to the housing and disposed at opposite sides of the cylinder from one another, the first and second latch arms each having a central portion and first and second end portions, the latch arms each being pivoted to the housing for pivoting movement about an axis through the central portion of the latch arm, the first end portion of each latch arm including a latch surface, the cylinder having an exterior with elongated latch gripping surfaces positioned along the cylinder exterior and in position for selective engagement with the latch surfaces carried by the latch arms, a fluid actuator having an actuator cylinder with an actuator piston contained in the actuator cylinder and an actuator piston rod coupled to the actuator piston and extending outwardly from the actuator cylinder, a first link pivotally coupling the actuator piston rod to the second end portion of the first arm, a second link pivotally coupling the actuator piston rod to the second end portion of the second latch arm, wherein extension and retraction of the actuator piston rod pivots the respective first and second latch arms between respective first positions in which the latch surfaces engage the latch gripping surfaces and second positions in which the latch surfaces are disengaged from the latch gripping surfaces.

14. A vibration damper according to claim 13, wherein the latch gripping surface and latch gripping surfaces each comprise teeth.

15. A vibration damper according to claim 13 wherein the shock absorber is adapted to provide a non-linear dampening force to the seat to dampen seat vibrations, the dampening force being constant for a first range of movement of the seat in response to vibrations from a home position of the dampening piston and increasing for certain movements in excess of the first range of movement.

16. A vibration dampener for a seat suspension system of a type which supports a seat above the floor of a vehicle, the seat being raisable and lowerable to support the seat at various selected elevations relative to the floor of the vehicle, and wherein movement of the seat from a selected elevation in response to vibration is permitted, the vibration damper comprising:

a shock absorber which provides a dampening force in opposition to movement of the seat away from a selected elevation in response to vibrations, the dampening force being constant for a first range of movements of the seat in response to vibrations from a home position and increasing for certain movements in excess of the first range of movements; and the shock absorber comprising an exterior housing, a piston positioned within the housing, and a piston rod projecting outwardly from the housing, the piston rod being coupled to one of the seat or the vehicle for applying the dampening force to the seat, and wherein the shock absorber housing comprises a latch engaging surface.

17. A vibration dampener according to claim 16 in which the latch engaging surface comprises a teeth containing member mounted to the shock absorber housing.

18. A vibration dampener according to claim 16 including a latch adapted to selectively engage the latch surface to operatively couple the shock absorber to the seat so as to apply a dampening force to the seat and to selectively disengage the latch surface to decouple the shock absorber from the seat so as to relieve the application of a dampening force to the seat.

19. A vibration dampener according to claim 18 in which the shock absorber when operatively coupled to the seat provides a dampening force in opposition to movement of the seat away from a selected elevation in response to vibrations, the dampening force being constant for a first range of movements of the seat in response to vibrations from a home position and increasing for certain movements in excess of the first range of movements.

20. A vibration dampener for a seat suspension system of a type which supports a seat above the floor of a vehicle, the seat being raisable and lowerable to support the seat at various selected elevations relative to the floor of the vehicle, and wherein movement of the seat from a selected elevation in response to vibration is permitted, the vibration damper comprising:

a shock absorber having an exterior housing, a piston positioned within the housing, and a piston rod extending from the housing, the piston rod adapted for coupling to the seat for applying a dampening force to the seat, and wherein the shock absorber housing comprises a latch engaging surface which is adapted for engagement by a latch to operatively couple the shock absorber to the seat.

21. A vibration damper for a seat suspension system of the type which supports a seat above the floor of a vehicle, the seat being raisable and lowerable to support the seat at various selected elevations relative to the floor of the vehicle, and wherein movement of the seat from a selected elevation in response to vibrations is permitted, the vibration damper comprising:

a housing adapted for pivotal coupling to the floor of the vehicle;

a shock absorber adapted to be coupled to the seat;

a latch adapted to selectively couple the housing to the shock absorber such that when the shock absorber and housing are coupled together the shock absorber applies a dampening force to the seat and when the shock absorber and housing are decoupled from one another the shock absorber is relieved from applying a dampening force to the seat;

wherein the housing has an interior and an exterior, the shock absorber being substantially positioned within the interior of the housing, and wherein the latch is carried by the housing and selectively couples and decouples the shock absorber to and from the housing to thereby selectively apply and relieve the application of the dampening force to the seat;

the shock absorber having a cylinder and a latch gripping surface carried by the cylinder, the shock absorber also including a dampening piston within the cylinder and a piston rod coupled to the piston and having an end portion projecting outwardly from the piston and which is adapted to be coupled to the seat, the latch including first and second latch arms each including a latch surface, the latch arms being coupled to the housing with the latch arms being movable between first and second positions, wherein when the latch arms are in the first position the latch surface and latch gripping surfaces engage one another to thereby couple the shock absorber to the housing and wherein when the latch arms are in the second position the latch surfaces are disengaged from the latch gripping surface;

the latch gripping surface and latch surface each comprising a plurality of teeth;

the latch arms being pivoted to the housing for pivoting movement between the first and second positions;

a fluid actuator carried by the housing and coupled to the latch arms for shifting the latch arms between the first and second positions;

wherein the cylinder is also slidably coupled to the housing for sliding movement relative to the housing;

the housing having a first side wall with an exterior surface at the exterior of the housing and an interior surface at the interior of the housing, the first side wall including first and second side wall portions spaced apart from one another to define a guide slot therebetween, a slide element mounted to the cylinder and slidably coupled to the first and second side wall portions such that the slide element slides along the guide slot and guides the sliding motion of the cylinder relative to the housing;

wherein the slide element includes first and second interconnected slide members which sandwich the respective first and second side wall portions therebetween, the first slide member being positioned substantially within the housing, the first slide member including respective first and second teeth containing flange portions extending in a direction away from the first side wall of the housing, the first and second teeth containing flange portions being spaced apart from one another and positioned at opposite sides of the center of the cylinder from one another, the latch arm having a generally U-shaped cross section with a base and first and second leg portions, the first and second leg portions each terminating in an elongated row of teeth, the first and second leg portions each being aligned with a respective adjacent one of the first and second teeth supporting flange portions of the first slide member, and wherein the teeth of the first and second leg portions engage the teeth of the respective adjacent flange portions when the latch arm is in the first position; and wherein the housing includes a second wall opposite to the first wall, the second wall including an arm flange receiving opening therein, the latch arm including an arm flange projecting from the base toward the arm flange receiving opening, an actuator guide flange projecting outwardly from the second wall of the housing, the guide flange defining an actuator guide slot, a fluid actuator having an actuator cylinder which is pivoted to the housing, an actuator piston within the actuator cylinder and an actuator piston rod having an end portion projecting outwardly from the actuator cylinder, a link pivotally coupling the end portion of the actuator piston rod to the latch arm flange, the end portion of -the actuator piston rod also being coupled to the actuator guide flange such that the actuator guide slot guides the movement of the actuator piston rod during extension and retraction of the actuator piston rod, wherein extension of the actuator piston rod shifts the latch arm to the first position and retraction of the actuator piston rod shifts the latch arm to the second position.

22. A vibration damper for a seat suspension system of the type which supports a seat above the floor of a vehicle, the seat being raisable and lowerable to support the seat at various selected elevations relative to the floor of the vehicle, and wherein movement of the seat from a selected elevation in response to vibrations is permitted, the vibration damper comprising:

a housing adapted for pivotal coupling to the floor of the vehicle;

a shock absorber adapted to be coupled to the seat;

a latch adapted to selectively couple the housing to the shock absorber such that when the shock absorber and housing are coupled together the shock absorber applies a dampening force to the seat and when the shock absorber and housing are decoupled from one another the shock absorber is relieved from applying a dampening force to the seat;

wherein the housing has an interior and an exterior, the shock absorber being substantially positioned within the interior of the housing, and wherein the latch is carried by the housing and selectively couples and decouples the shock absorber to and from the housing to thereby selectively apply and relieve the application of the dampening force to the seat;

the shock absorber having a cylinder and a latch gripping surface carried by the cylinder, the shock absorber also including a dampening piston within the cylinder and a piston rod coupled to the piston and having an end portion projecting outwardly from the piston and which is adapted to be coupled to the seat;

the latch including first and second latch arms each including a latch surface, the latch arms being coupled to the housing with the latch arms being movable between first and second positions, wherein when the latch arms are in the first position the latch surface and latch gripping surfaces engage one another to thereby couple the shock absorber to the housing and wherein when the latch arms are in the second position the latch surfaces are disengaged from the latch gripping surface;

the latch gripping surface and latch surfaces each comprising a plurality of teeth;

the latch arms being pivoted to the housing for pivoting movement between the first and second positions;

a fluid actuator carried by the housing and coupled to the latch arms for shifting the latch arms between the first and second positions;

wherein the latch arms are disposed at opposite sides of the cylinder from one another, the first and second latch arms each having a central portion and first and second end portions, the latch arms each being pivoted to the housing for pivoting movement about an axis through the central portion of the latch arm, the first end portion of each latch arm including a latch surface, the cylinder having an exterior with elongated latch gripping surfaces positioned along the cylinder exterior and in position for selective engagement with the latch surfaces carried by the latch arms, a fluid actuator having an actuator cylinder with an actuator piston contained in the actuator cylinder and an actuator piston rod coupled to the actuator piston and extending outwardly from the actuator cylinder, a first link pivotally coupling the actuator piston rod to the second end portion of the first arm, a second link pivotally coupling the actuator piston rod to the second end portion of the second latch arm, wherein extension and retraction of the actuator piston rod pivots the respective first and second latch arms between respective first positions in which the latch surfaces engage the latch gripping surfaces and second positions in which the latch surfaces are disengaged from the latch gripping surfaces.

23. A vibration dampener for a seat suspension system of a type which supports a seat above the floor of a vehicle, the seat being raisable and lowerable to support the seat at various selected elevations relative to the floor of the vehicle, and wherein movement of the seat from a selected elevation in response to vibration is permitted, the vibration damper comprising:

a shock absorber which provides a dampening force in opposition to movement of the seat away from a selected elevation in response to vibrations, the dampening force being constant for a first range of movements of the seat in response to vibrations from a home position and increasing for certain movements in excess of the first range of movements;

the shock absorber comprises a housing, a piston positioned within the housing and a piston rod; and a jack screw for adjusting the position of the housing relative to the seat without, during seat elevation adjustment, decoupling the shock absorber from the seat.

24. A vibration dampener for a seat suspension system of a type which supports a seat above the floor of a vehicle, the seat being raisable and lowerable to support the seat at various selected elevations relative to the floor of the vehicle, and wherein movement of the seat from a selected elevation in response to vibration is permitted, the vibration damper comprising:

a shock absorber which provides a dampening force in opposition to movement of the seat away from a selected elevation in response to vibrations, the dampening force being constant for a first range of movements of the seat in response to vibrations from a home position and increasing for certain movements in excess of the first range of movements; the shock absorber comprises a housing, a piston positioned within the housing and a piston rod; and a latch adapted to selectively decouple the shock absorber from the seat.

25. A vibration dampener for a seat suspension system of a type which supports a seat above the floor of a vehicle, the seat being raisable and lowerable to support the seat at various selected elevations relative to the floor of the vehicle, and wherein movement of the seat from a selected elevation in response to vibration is permitted, the vibration damper comprising:

a shock absorber which provides a dampening force in opposition to movement of the seat away from a selected elevation in response to vibrations;

the shock absorber comprising a housing, a piston positioned within the housing and a piston rod;

the shock absorber when operatively coupled to the seat provides a non-linear dampening force in opposition to movement of the seat away from a selected elevation in response to vibrations;

a mechanism adapted to adjust the position of the housing relative to the seat without, during seat elevation adjustment, decoupling the shock absorber from the seat; and the last named mechanism comprises a jack screw.

* * * * *

UNITED STATES PATENT AND TRADEMARK OFFICE
CERTIFICATE OF CORRECTION

PATENT NO. : 6,340,152 B1
DATED : January 22, 2002
INVENTOR(S) : Ritchie et al.

It is certified that error appears in the above-identified patent and that said Letters Patent is hereby corrected as shown below:

<u>Title page,</u>
Item [56], U.S. PATENT DOCUMENTS, add the following references:

| | | |
|---|---|---|
| --2,106,066 | 9/1936 | Sandgrove |
| 2,357,825 | 9/1944 | Hickman et al. |
| 2,433,950 | 1/1948 | Henderson |
| 2,877,825 | 7/1954 | Olson |
| 3,150,855 | 9/1964 | Carter et al. |
| 3,189,312 | 6/1965 | Bilancia |
| 3,276,736 | 10/1966 | Dome |
| 3,339,906 | 9/1967 | Persson |
| 3,649,786 | 3/1972 | Mauron |
| 3,744,562 | 5/1973 | Fourrey |
| 3,877,748 | 4/1975 | Eggert |
| 3,897,036 | 7/1975 | Nystrom |
| 3,951,373 | 4/1976 | Swenson et al. |
| 3,954,245 | 5/1976 | Costin |
| 3,990,668 | 11/1976 | Thompson et al. |
| 3,999,800 | 12/1976 | Penzotti |
| 4,121,802 | 10/1978 | Kluting et al. |
| 4,198,025 | 4/1980 | Lowe et al. |
| 4,363,377 | 12/1982 | Van Gerpen |
| 4,461,444 | 7/1984 | Grassl et al. |
| 4,473,724 | 9/1984 | Suzuki |
| 4,536,029 | 8/1985 | Rogers, Jr. |
| 4,638,982 | 1/1987 | Misher et al. |
| 4,678,872 | 7/1987 | Gutman |
| 4,695,682 | 9/1987 | Winogrocki |
| 4,709,896 | 12/1987 | Wahls et al. |
| 4,714,227 | 12/1987 | Holm et al. |
| 4,807,932 | 2/1989 | Hong |
| 4,809,944 | 3/1989 | Smith et al. |
| 4,889,389 | 12/1989 | White |
| 4,986,591 | 1/1991 | Martienssen et al. |
| 5,015,010 | 5/1991 | Homeier et al. |
| 5,128,500 | 7/1992 | Hirschfield |
| 5,169,112 | 12/1992 | Boyles et al. |
| 5,176,355 | 1/1993 | Carter |
| 5,221,071 | 6/1993 | Hill |
| 5,234,203 | 8/1993 | Smith |
| 5,278,363 | 1/1994 | Krieg et al. |

UNITED STATES PATENT AND TRADEMARK OFFICE
CERTIFICATE OF CORRECTION

PATENT NO. : 6,340,152 B1
DATED : January 22, 2002
INVENTOR(S) : Ritchie et al.

It is certified that error appears in the above-identified patent and that said Letters Patent is hereby corrected as shown below:

Title page (cont'd),
5,294,085   3/1994    Lloyd et al.
5,346,170   9/1994    Schmidt et al.
5,379,980   1/1995    Houghton, Jr. et al.
5,3 84,440  1/1995    Wnuk et al.
5,427,433   6/1995    Holobaugh, Jr.
5,475,592   12/1995   Wnuk et al.
5,542,638   8/1996    Smith
5,570,866   11/1996   Stephens
5,582,385   12/1996   Boyle et al.
5,636,884   6/1997    Ladetto et al.
5,651,585   7/1997    Van Duser
5,652,704   7/1997    Catanzarite
5,668,357   9/1997    Takiguchi et al.
5,671,964   9/1997    DeRees et al.
5,678,889   12/1997   Purcell, Jr.
5,732,370   3/1998    Boyle et al.
5,864,105   1/1999    Andrews --
OTHER PUBLICATIONS, add:
-- Page 82 from January 15, 1998, issue of Machine Design Showing prior art Navigator Air spring --
-- Monroe Sensatrac Shocks and Struts advertisement (undated) showing prior art shock absorber with piston bypass grooves --
-- Shock Absorber drawing showing prior art shock absorber --

Column 6,
Line 5, please delete "15"
Line 28, please delete "30".

Column 10,
Line 12, "35.9" should be -- 135.9 --.

Column 13,
Line 35, please delete "10".

Column 16,
Line 24, please delete "apart".

UNITED STATES PATENT AND TRADEMARK OFFICE
CERTIFICATE OF CORRECTION

PATENT NO. : 6,340,152 B1
DATED : January 22, 2002
INVENTOR(S) : Ritchie et al.

It is certified that error appears in the above-identified patent and that said Letters Patent is hereby corrected as shown below:

Column 20,
Line 61, please delete "10".

Column 27,
Line 58, "scat" should be -- seat --.

Column 32,
Line 33, "of -the" should be -- of the --.

Signed and Sealed this

Seventh Day of October, 2003

JAMES E. ROGAN
*Director of the United States Patent and Trademark Office*